US012643356B2

(12) United States Patent
Peacemaker et al.

(10) Patent No.: US 12,643,356 B2
(45) Date of Patent: Jun. 2, 2026

(54) POWER THROUGH TRAILER HITCH SYSTEMS AND METHODS

(71) Applicant: SOS Solutions, Inc., Tonasket, WA (US)

(72) Inventors: Samuel R. Peacemaker, Gilbert, AZ (US); Benjamin Peacemaker, Chandler, AZ (US)

(73) Assignee: SOS Solutions, Inc., Tonasket, WA (US)

( * ) Notice: Subject to any disclaimer, the term of this patent is extended or adjusted under 35 U.S.C. 154(b) by 803 days.

(21) Appl. No.: 17/838,084

(22) Filed: Jun. 10, 2022

(65) Prior Publication Data

US 2023/0069630 A1     Mar. 2, 2023

Related U.S. Application Data

(63) Continuation-in-part of application No. 17/410,982, filed on Aug. 24, 2021.

(51) Int. Cl.
*B60D 1/64* (2006.01)
*B60D 1/06* (2006.01)

(52) U.S. Cl.
CPC ... *B60D 1/64* (2013.01); *B60D 1/06* (2013.01)

(58) Field of Classification Search
CPC ... B60D 1/62; B60D 1/64; B60D 1/06; B60D 1/065; H05F 3/02
USPC .......................... 280/420, 422; 439/8, 34, 35
See application file for complete search history.

(56) References Cited

U.S. PATENT DOCUMENTS

| | | | |
|---|---|---|---|
| 2,564,520 | A | 8/1951 | Scheim et al. |
| 2,673,965 | A | 3/1954 | Cass |
| 3,047,839 | A | 7/1962 | Brown et al. |
| 3,116,940 | A | 1/1964 | Jines |

(Continued)

FOREIGN PATENT DOCUMENTS

| | | |
|---|---|---|
| DE | 202009009403 U1 | 12/2010 |
| WO | 9965714 | 12/1999 |

(Continued)

OTHER PUBLICATIONS

DE202009009403, "Towing Device", dated Nov. 18, 2010, English translation. (Year: 2010).*

(Continued)

*Primary Examiner* — Anne Marie M Boehler

(74) *Attorney, Agent, or Firm* — Snell & Wilmer L.L.P.

(57) ABSTRACT

A trailer hitch system of the present disclosure includes a power through ball hitch and a power through trailer coupler equipped with electronic connectors such that an electric connection between a tow vehicle and a trailer is automatically made when the trailer coupler is attached to the ball hitch. The trailer hitch system may further include a ground plate configured to contact the trailer coupler for forming a continuous ground connection between the tow vehicle and the trailer. The trailer hitch system may further include a ball hitch adapter configured to couple to a hitch receiver and electrically connect to the ball hitch for grounding the ball hitch to the tow vehicle and/or supplying power to the power through ball hitch. The ball hitch adapter may be adaptable to various existing receiver hitch lengths, ball hitch lengths, and/or class ratings.

16 Claims, 22 Drawing Sheets

(56)                References Cited

U.S. PATENT DOCUMENTS

| | | | |
|---|---|---|---|
| 3,328,741 | A * | 6/1967 | Brown ..................... B60D 1/62 |
| | | | 439/708 |
| 3,519,975 | A | 7/1970 | Prow, Jr. et al. |
| 3,710,370 | A | 1/1973 | Quilici et al. |
| 3,858,907 | A | 1/1975 | Van Raden |
| 4,283,072 | A | 8/1981 | Deloach, Jr. |
| 5,909,891 | A | 6/1999 | Swart et al. |
| 6,222,443 | B1 | 4/2001 | Beeson et al. |
| 6,481,738 | B1 | 11/2002 | Duncan et al. |
| 7,455,524 | B1 | 11/2008 | Fudala et al. |
| 7,850,191 | B1 | 12/2010 | Kaminski et al. |
| 8,262,119 | B2 | 9/2012 | Glazner |
| 8,308,181 | B2 | 11/2012 | Riibe |
| 8,369,780 | B2 | 2/2013 | Bauer et al. |
| 8,465,041 | B2 | 6/2013 | Riibe |
| 8,475,176 | B2 | 7/2013 | Holmes et al. |
| 8,678,419 | B2 | 3/2014 | Glazner |
| 8,840,128 | B2 | 9/2014 | Glazner |
| 9,085,208 | B1 | 7/2015 | Riibe |
| 9,834,133 | B2 | 12/2017 | Bean |
| 10,059,160 | B2 | 8/2018 | Ruiz et al. |
| 10,106,003 | B2 | 10/2018 | Cardenas |
| 10,164,392 | B1 | 12/2018 | Scheim et al. |
| 11,981,174 | B1 * | 5/2024 | Cardenas ................. B60D 1/06 |
| 2011/0278820 | A1 | 11/2011 | Riibe |
| 2017/0240125 | A1 | 8/2017 | Weigert et al. |
| 2019/0162584 | A1 | 5/2019 | Fredrickson |
| 2019/0363498 | A1 | 11/2019 | Cox et al. |
| 2023/0391152 | A1 * | 12/2023 | Salter .................... H01R 13/15 |

FOREIGN PATENT DOCUMENTS

| | | |
|---|---|---|
| WO | 2009003200 | 12/2008 |
| WO | 2018134582 | 7/2018 |
| WO | 2020056448 | 3/2020 |

OTHER PUBLICATIONS

International Search Report dated Dec. 29, 2022 in corresponding International Application No. PCT/US2022/040810 filed Aug. 18, 2022; total 4 pages.

Written Opinion of the International Searching Authority dated Dec. 29, 2022 in corresponding International Application No. PCT/US2022/040810 filed Aug. 18, 2022; total 6 pages.

International Preliminary Report on Patentability dated Feb. 27, 2024 in corresponding International Application No. PCT/US2022/040810 filed Aug. 18, 2022; total 7 pages.

Extended European Search Report for Application No. 22861912.8, mailed Aug. 25, 2025.

* cited by examiner

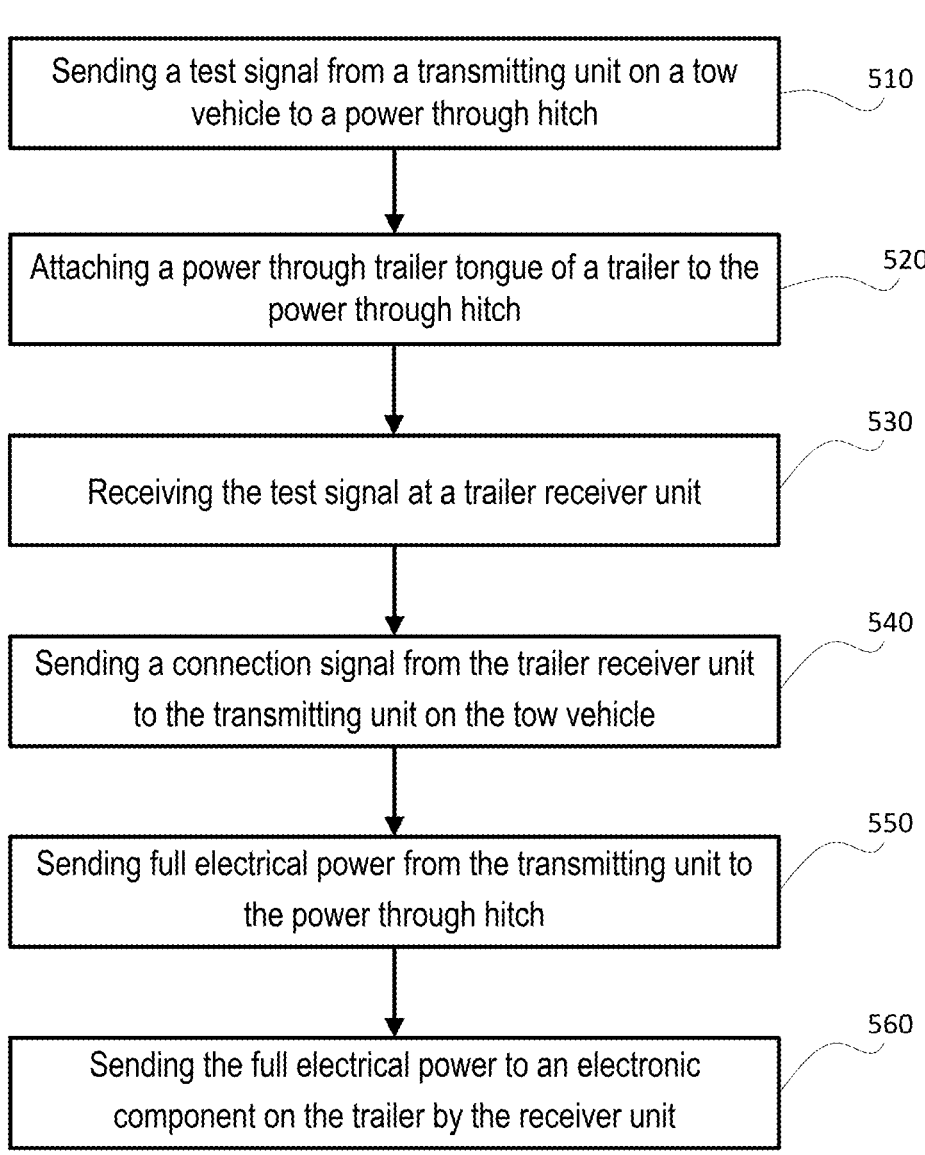

500

Sending a test signal from a transmitting unit on a tow vehicle to a power through hitch — 510

Attaching a power through trailer tongue of a trailer to the power through hitch — 520

Receiving the test signal at a trailer receiver unit — 530

Sending a connection signal from the trailer receiver unit to the transmitting unit on the tow vehicle — 540

Sending full electrical power from the transmitting unit to the power through hitch — 550

Sending the full electrical power to an electronic component on the trailer by the receiver unit — 560

FIG. 11

POWER THROUGH TRAILER HITCH SYSTEMS AND METHODS

CROSS REFERENCE TO RELATED APPLICATIONS

This application is a continuation-in-part of, and claims priority to, and the benefit of U.S. patent application Ser. No. 17/410,982, filed on Aug. 24, 2021, and entitled "POWER THROUGH TRAILER HITCH SYSTEMS AND METHODS" which is incorporated by reference herein in its entirety.

FIELD

The present disclosure relates generally to trailer hitching devices, and, more specifically, to electrical connections between a vehicle (e.g., a truck) and a trailer.

BACKGROUND

Many of the different types of trailers that are towed by trucks are connected to the trucks by a releasable coupling such as a gooseneck coupling, a fifth wheel coupling, a bumper pull coupling, and the like. A trailer typically has various electrical systems (e.g., brake and running lights) that are powered by the truck electrical system. An electrical cable is connected between the truck and trailer to supply truck electrical power to the trailer. A cable connector mounted on the truck provides a socket to receive a plug of the trailer electrical cable.

SUMMARY

A ball hitch is disclosed, in accordance with various embodiments. The ball hitch comprises a hitch portion for interfacing with a hitch receiver associated with a vehicle, a ball portion comprising a hitch ball configured to couple with a tongue of a trailer, and a grounding plate configured to contact the tongue of the trailer in response to the ball portion being coupled with the tongue of the trailer.

In various embodiments, the grounding plate is mounted to the hitch portion. In various embodiments, the grounding plate extends from the hitch portion toward the ball portion. In various embodiments, the grounding plate is cantilevered. In various embodiments, the grounding plate comprises an electrically conductive material. In various embodiments, the grounding plate is configured to flex between a first position and a second position to preload the grounding plate in response to the ball portion being coupled with the tongue of the trailer. In various embodiments, the grounding plate is located between a base of the ball portion and a tip of the ball portion. In various embodiments, the ball hitch further comprises a first electrical contact disposed on the ball portion, a second electrical contact disposed on the hitch portion, a conductor extending from the first electrical contact to the second electrical contact, wherein the first electrical contact, the second electrical contact, and the conductor are electrically insulated from a body of the hitch portion and a body of the ball portion, and a third electrical contact electrically coupled to the body of the hitch portion, wherein the grounding plate is electrically coupled to the body of the hitch portion. In various embodiments, the second electrical contact and the third electrical contact are located at a first side of the hitch portion and the ball portion is located at a second side of the hitch portion. In various embodiments, the third electrical contact is configured to ground the ball hitch to the vehicle.

A ball hitch adapter is disclosed, in accordance with various embodiments. The ball hitch adapter comprises a tubular body configured to be mounted to a hitch receiver for a vehicle, a first electrical contact extending from a first end of the tubular body, and a second electrical contact extending from the first end of the tubular body.

In various embodiments, the tubular body is configured to be received at least partially into the hitch receiver. In various embodiments, the tubular body is configured to receive an end of the hitch receiver. In various embodiments, the ball hitch adapter further comprises a first electrical wire electrically coupled to the first electrical contact, and a second electrical wire electrically coupled to the second electrical contact, wherein the first electrical wire and the second electrical wire are configured to extend from a second end of the tubular body. In various embodiments, at least one of the first electrical contact or the second electrical contact is spring loaded. In various embodiments, the tubular body is configured to be trimmed from an initial length to a trimmed length.

A grounding plate for a ball hitch is disclosed, in accordance with various embodiments. The grounding plate comprises a flexible metallic plate comprising a mounting surface defining a first end of the flexible metallic plate, a curved portion, and a contact surface defining a second end of the flexible metallic plate. The flexible metallic plate is configured to be coupled to the ball hitch and extend from a hitch portion of the ball hitch toward a ball portion of the ball hitch in a cantilevered manner. The contact surface of the grounding plate is configured to contact a tongue of a trailer in response to the ball portion being coupled with the tongue of the trailer, the flexible metallic plate is configured to bend away from the ball hitch via the curved portion, and the mounting surface is configured to contact the ball hitch.

In various embodiments, the grounding plate comprises an electrically conductive material. In various embodiments, the grounding plate is configured to flex between a first position and a second position to preload the grounding plate in response to the ball portion being coupled with the tongue of the trailer. In various embodiments, the grounding plate comprises a recess configured to receive the ball portion. In various embodiments, the grounding plate comprises a first finger configured to extend around a first side of the ball portion and a second finger configured to extend around a second side of the ball portion, wherein the first finger and the second finger at least partially define the recess.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be example in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 11 illustrates a flow chart for a method for powering a trailer, in accordance with various embodiments.

DETAILED DESCRIPTION

Figure 1:
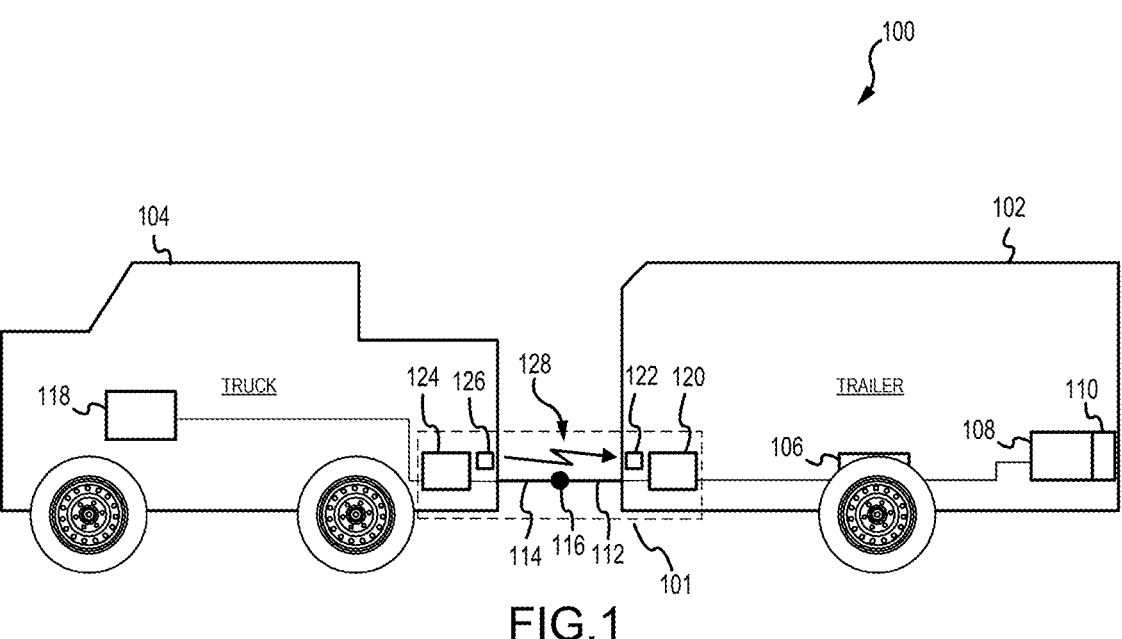
FIG. 1 illustrates a schematic view of an electric power system for a tow vehicle and trailer, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In this regard, "electronic communication," as used herein, includes wired and wireless communications (e.g., Bluetooth, TCP/IP, Wi-Fi, etc.).

The term "truck" is used herein to refer to any vehicle or device for towing another vehicle/trailer and is not meant to be limiting to a particular type of vehicle. For example, a truck may refer to a light duty truck (up to ~8,500 lbs (3855.5 kg) gross vehicle weight rating), a medium duty truck (from ~8,500 lbs (3855.5 kg) gross vehicle weight rating to ~26,000 lbs (11,793.4 kg) gross vehicle weight rating), and/or a heavy duty truck (from 26,000 lbs (11,793.4 kg) gross vehicle weight rating and above gross vehicle weight rating). However, the term "truck" as used herein may also refer to sport utility vehicles, station wagons, and/or passenger cars that may be configured to tow another vehicle/trailer.

The term "trailer" is used herein to refer to any wheeled vehicle which has wheels located in such a manner that the vehicle is adapted to be towed behind a powered vehicle such as a truck. The term "trailer" is also used herein to refer to non-wheeled attachments adapted to be coupled to a truck via a hitch receiver, including but not limited to, bike racks, cargo trays, tire carriers, power inverters, external batteries, and electric cooktops, among others.

A power through trailer hitch system of the present disclosure includes, in various embodiments, a power through ball hitch and a power through trailer coupler (also referred to as a trailer tongue) equipped with electronic connectors such that an electric connection is automatically made between a tow vehicle and trailer when the trailer coupler is attached to the ball hitch. A power through trailer hitch system of the present disclosure, in various embodiments, eliminates the need to manually plug in trailer wiring when connecting a trailer to a tow vehicle. A power through trailer hitch system of the present disclosure allows a user to simply lower the trailer onto the power through ball hitch and the electrical connection for powering brake lights, turn signals, running lights, trailer brakes, and other powered trailer accessories is formed automatically.

With reference to FIG. 1, a schematic view of an electric power system 100 for a truck 104 and trailer 102 is illustrated, in accordance with various embodiments. In various embodiments, a trailer 102 may be coupled behind truck 104 for towing. Trailer 102 may be any type of trailer, including a flatbed trailer, an enclosed trailer, a step deck trailer, a gooseneck trailer, a utility trailer, a stock trailer, a camper trailer, a fifth wheel trailer, or any other wheeled vehicle adapted to be towed behind a powered vehicle such as a truck. Trailer 102 may have various electronics onboard, such as trailer brakes 106, running lights 108, and/or brake lights 110, among others. Trailer 102 may receive electric power and control signal by a trailer hitch system 101 (also referred to herein as a power through trailer hitch system). Power through trailer hitch system 101 may include a first electrical conductor 112 and a second electrical conductor 114. Electrical conductor 112 may be coupled to trailer 102 for receiving electric power from truck 104 for powering the electronics onboard the trailer 102. Electrical conductor 112 may comprise any suitable conductor for routing electric power such as a wire, a cable, or the like. Electrical conductor 112 may be insulated. Stated differently, electrical conductor 112 may comprise a central conductor(s) or wire(s) enclosed in insulating material. Truck 104 may comprise electrical conductor 114. Electrical conductor 114 may be mounted to truck 104. Electrical conductor 114 may be similar to electrical conductor 112 in various embodiments. Electrical conductor 114 may be coupled to electrical conductor 112 at a power connection 116 when trailer 102 is coupled to truck 104 for towing. In this manner, electrical power from a power distribution module 118 onboard truck 104 may be routed to trailer 102 by electrical conductor 112 and electrical conductor 114 for powering the electronics onboard the trailer 102. Connection 116 may be made at a point of mechanical connection between truck 104 and trailer 102 as described herein.

As used herein, power distribution module 118 comprises any hardware and/or software suitably configured to facilitate the provisioning of electric power to any number of DC-powered components located on both the tractor truck 104 and on the trailer 102. It will be appreciated that the positioning and configuration of power distribution module 118 may vary among makes and models of trucks and that some configurations may include more than one power distribution module 118.

Trailer 102 may be equipped with a control unit 120 configured to detect when trailer 102 is connected with truck 104. Control unit 120 may include one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 120 detects that trailer 102 is coupled to truck 104. In various embodiments, the control unit 120 controls, at least various parts of, and operation of various components of, the trailer 102. For example, the control unit 120 may control, at least in part, operation of trailer brakes 106, running lights 108, and/or brake lights 110. In various embodiments, control unit 120 controls operation of trailer brakes 106, running lights 108, and/or brake lights 110 based upon input received (e.g., via transceiver 122 and/or via connection 116) from control unit 124 of truck 104.

Trailer 102 may further be equipped with a transceiver 122. Control unit 120 may be in electronic communication with transceiver 122. As described herein, control unit 120 may detect that trailer 102 is coupled to truck 104 in response to receiving a power signal from conductor 114. Trailer 102 may similarly be equipped with a control unit 124 and a transceiver 126. Control unit 124 may be in electronic communication with transceiver 126. In response to detecting that trailer 102 is coupled to truck 104, control unit 120 may cause transceiver 122 to send a wireless signal 128 to transceiver 126. In response to receiving the wireless signal 128, control unit 124 may cause power distribution module 118 to send a full power signal to trailer 102 via connection 116 for powering the electronics onboard trailer 102. In an example embodiment, power distribution module 118 may send a full power signal comprising a 12 volt DC power signal, though other voltage levels are contemplated herein, such as 24V DC and 48V DC.

Although described as control unit 120 detecting the connection 116, it is similarly contemplated that control unit 124 may detect the connection 116. Control unit 124 may subsequently cause power distribution module 118 to send the full power signal to trailer 102 in response to detecting connection 116.

Connection 116 may be detected by control unit 120 and/or control unit 124 by detecting a flow of current through conductor 114 and conductor 112 via connection 116. In this regard, power distribution module 118 may be configured to periodically (or continuously) send a low voltage power signal (e.g., a test signal) to conductor 114 to determine whether connection 116 has been made. Control unit 120 and/or control unit 124 may detect that trailer 102 is connected when electric current flows through connection 116. Conversely, control unit 120 and/or control unit 124 may detect that trailer 102 is not connected when electric current does not flow through connection 116. Electric current through connection 116 may be detected using any suitable method, such as via a current meter for example, among others. In various embodiments, the test signal comprises a low voltage signal compared to the full power signal. In this manner, an electrical hazard may be prevented when conductor 114 is not yet connected to conductor 112. For example, conductor 114 may comprise an exposed contactor before being connected to conductor 112.

In various embodiments, control unit 124 is in electronic communication with the truck 104 computer and may monitor when truck 104 is in park and/or in drive. Control unit 124 may be configured to disconnect all power to conductor 114 when truck 104 is in drive and a trailer is not connected.

It will be appreciated that the positioning and configuration of control unit 120 and transceiver 122 may vary among makes and models of trailers and that some configurations may include more than one control unit 120. Likewise, it will be appreciated that the positioning and configuration of control unit 124 and transceiver 126 may vary among makes and models of trucks and that some configurations may include more than one control unit 124.

Figure 2:
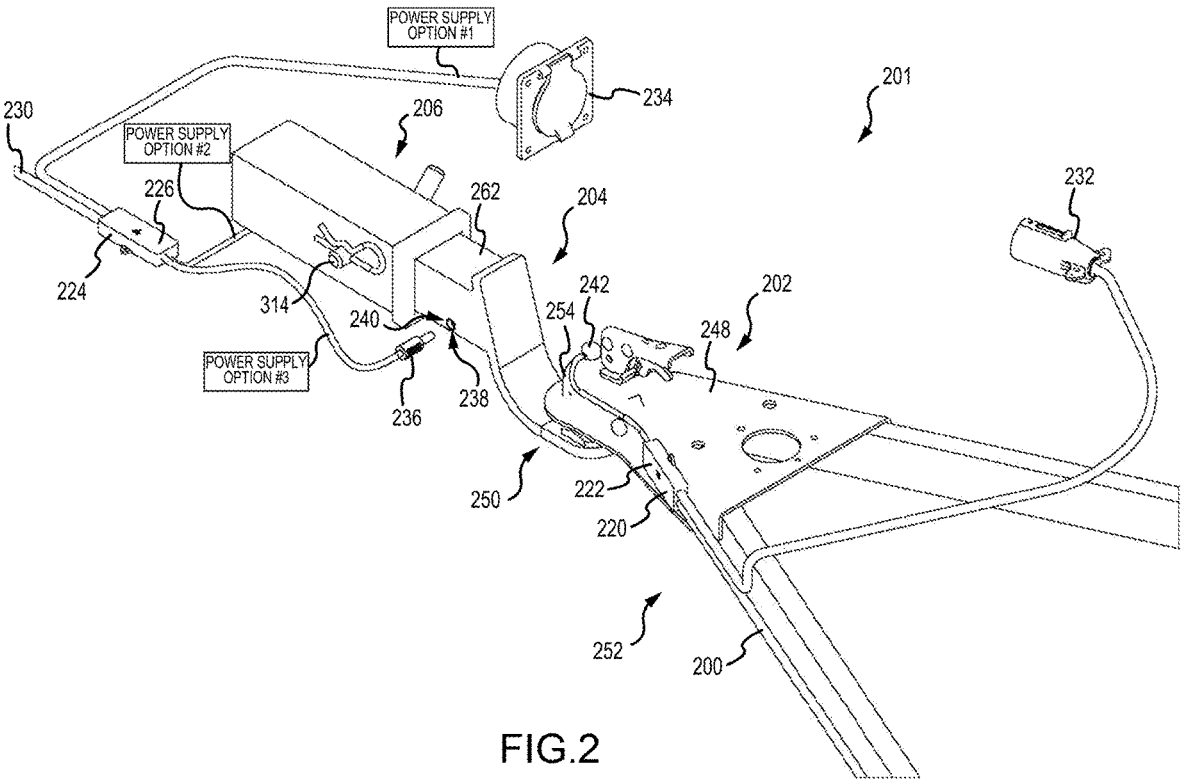
FIG. 2 illustrates a power through trailer hitch system, in accordance with various embodiments.

With reference to FIG. 2, a trailer hitch system 201 (also referred to herein as a power through trailer hitch system) is illustrated, in accordance with various embodiments. In various embodiments, power through trailer hitch system 201 is similar to power through trailer hitch system 101 of FIG. 1. Power through trailer hitch system 201 may be configured as a bumper pull hitching system. Power through trailer hitch system 201 may include a trailer coupler 202. Trailer coupler 202 may be configured to be coupled to the forward end of a trailer (e.g., trailer 102 of FIG. 1). Power through trailer hitch system 201 may further include a ball hitch 204 (also referred to herein as a power through ball hitch). Trailer coupler 202 may be secured to ball hitch 204 when coupling a trailer to a truck for towing. Power through trailer hitch system 201 may further include a hitch receiver 206. Ball hitch 204 may be configured to be received by a hitch receiver 206. Hitch receiver 206 may be configured to be mounted to a rear end of a truck (e.g., truck 104 of FIG. 1). Ball hitch 204 may be configured to be removably coupled to hitch receiver 206.

During operation, a power line 230 may supply electrical power from a power distribution module onboard a tow vehicle (e.g., power distribution module 118 of FIG. 1) to power the power through trailer hitch system 201. FIG. 2 illustrates three methods or connection points for power to be supplied to a trailer. All three of these methods are displayed in FIG. 2. It should be understood that while FIG. 2 illustrates a power through trailer hitch system 201 including all three systems for supplying power, one or more of these systems may be omitted in a given design as desired.

The first method (labeled as "power supply option #1" in FIG. 2) illustrated in FIG. 2 for supplying power to the trailer electronics is via a plug and socket, such as plug 232 and socket 234. In this regard, vehicles with power through hitches (e.g., ball mount 204 and/or hitch receiver 206) may also have a standard socket (e.g., such as a 7 pin or 4 pin socket), such as socket 234, for backward compatibility with non-power through trailers. Likewise, trailers with power through trailer couplers (e.g., trailer coupler 202) may also have a standard plug (e.g., such as a 7 pin or 4 pin plug), such as plug 232, for backward compatibility with non-power through hitches. Providing a power through trailer hitch system 201 with a standard plug-and-socket connection may increase the compatibility of the system with a variety of existing trucks and trailers that may not be equipped with a power through hitch system as disclosed herein.

In various embodiments, power through trailer hitch system 201 further comprises a control unit 220. Control unit 220 may be similar to control unit 120 of FIG. 1. In various embodiments, power through trailer hitch system 201 further comprises a control unit 224. Control unit 224 may be similar to control unit 124 of FIG. 1. During operation using the first method, control unit 224 may direct electric power from power line 230 to socket 234. When plug 232 is connected with socket 234, the electric power is routed from socket 234 to control unit 220 by the plug 232. In this regard, control unit 220 may receive electric power from power line 230 via plug 232 and socket 234.

Figure 3A:
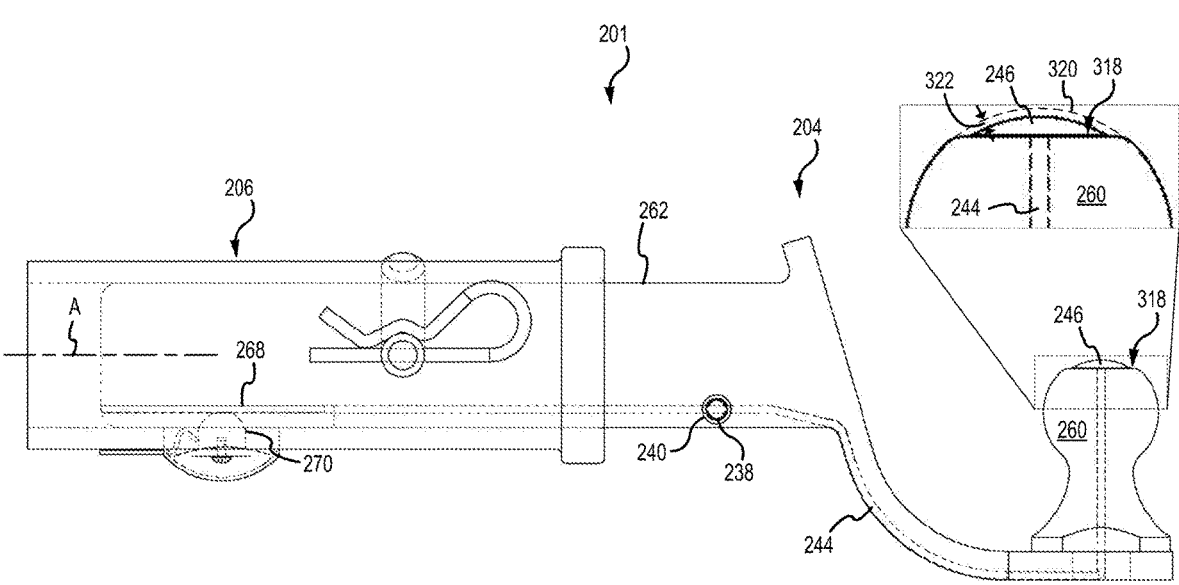
FIG. 3A illustrates an isolated view of a power through ball hitch installed onto a power through hitch receiver, in accordance with various embodiments.

The second and third methods (labeled as "power supply option #2" and "power supply option #3," respectively, in FIG. 2) illustrated in FIG. 2 for supplying power to the trailer electronics are via ball hitch 204. With reference to FIG. 3A, an isolated view of ball hitch 204 installed onto hitch receiver 206 is illustrated, in accordance with various embodiments. With combined reference to FIG. 2 and FIG. 3A, ball hitch 204 may comprise a ball portion 260. Ball portion 260 may comprise a hitch ball. Ball portion 260 may be configured to couple with trailer coupler 202. Ball hitch 204 may further comprise a hitch portion 262. Ball portion 260 may be mounted onto hitch portion 262. Hitch portion 262 may be configured for interfacing with hitch receiver 206 associated with a vehicle (e.g., truck 104 of FIG. 1).

In various embodiments, ball hitch 204 further includes an electrical contact 246 (also referred to herein as a first electrical contact). Electrical contact 246 may be coupled to ball portion 260. Ball portion 260 may comprise a cut off surface 318 at an upper end of ball portion 260. Stated differently, the tip of ball portion 260 may be cut off such that the tip of ball portion 260 terminates in a flat surface or any other shaped surface such that the tip of ball portion 260 (i.e., cut off surface 318) does not continue with the overall contour (illustrated by dashed line 320) of ball portion 260. In particular, cut off surface 318 is set inward from contour 320 and provides a platform for electrical contact 246 such that electrical contact 246 may also be set inward from contour 320 by a gap 322. In this manner, electrical contact 246 may be prevented from undesirably contacting socket 254 (see FIG. 5A). In this regard, electrical contact 246 may be disposed at the tip of ball portion 260.

Ball hitch 204 may further include a conductor 244. Conductor 244 may extend from electrical contact 246. Conductor 244 may comprise any suitable conductor for routing electric power such as a wire, a cable, a busbar, or the like. Ball hitch 204 may further include an electrical contact 268 (also referred to herein as a second electrical contact). Conductor 244 may extend from electrical contact 268 to electrical contact 246. In this regard, electrical contact 268 may be electrically connected with conductor 244. Electrical contact 268 may be electrically connected with electrical contact 246 by conductor 244. In this regard, conductor 244 may provide an electrically conductive path from electrical contact 268 to electrical contact 246.

Hitch receiver 206 may define a longitudinal axis A. In various embodiments, ball hitch 204 may be received by hitch receiver 206 by sliding ball hitch 204 along longitudinal axis A into hitch receiver 206. In various embodiments, power through trailer hitch system 201 comprises an electrical contact 270. Electrical contact 270 may be mounted to hitch receiver 206. Electrical contact 268 may be configured to contact electrical contact 270 in response to ball hitch 204 being installed onto hitch receiver 206. In this regard, a connection between electrical contact 268 and electrical contact 270 may be automatically formed in response to ball hitch 204 being installed onto hitch receiver 206.

The second method illustrated in FIG. 2 for supplying power to the trailer electronics includes supplying electrical power from power line 230 to ball hitch 204 via hitch receiver 206. In this regard, the second method includes sliding the hitch portion 262 of ball hitch 204 along longitudinal axis A into hitch receiver 206. In response to being installed into hitch receiver 206, electrical contact 268 may contact electrical contact 270 thereby forming an electrical connection between hitch receiver 206 and ball hitch 204. Electrical power may be received by electrical contact 270 from power line 230 and transmitted through electrical contact 268, through conductor 244, and to electrical contact 246. As described herein, trailer coupler 202 may be electrically coupled to ball hitch 204 via electrical contact 246 in response to trailer coupler 202 being installed onto ball hitch 204 for transmitting electrical power to an electronics system onboard a trailer, as described in further detail herein.

The third method illustrated in FIG. 2 for supplying power to the trailer electronics includes supplying electrical power from power line 230 directly to ball hitch 204 (i.e., bypassing hitch receiver 206). In this regard, power through trailer hitch system 201 further comprises an electrical connector 236. The third method includes supplying power from power line 230 to ball hitch 204 via electrical connector 236. The third method is particularly useful when retrofitting ball hitch 204 into an existing hitch receiver that does not include a power through hitch receiver (e.g., that does not include electrical contact 270).

In this regard, ball hitch 204 may further include an electrical contact 238 (also referred to herein as a second electrical contact and/or a third electrical contact). Conductor 244 may extend from electrical contact 238 to electrical contact 246. Electrical contact 238 may be electrically connected with conductor 244. Electrical contact 246 may be electrically connected with electrical contact 246 by conductor 244. In this regard, conductor 244 may provide an electrically conductive path from electrical contact 238 to electrical contact 246. In various embodiments, electrical contact 238 comprises a socket type electrical connection. Ball hitch 204 may comprise an aperture or opening 240. Opening 240 may be disposed in a side surface of ball hitch 204. Electrical contact 238 may be located at opening 240. In this regard, opening 240 may be for connecting electrical connector 236 to electrical contact 238. When electrical connector 236 is connected with contact 238, electric power is routed from power line 230 to control unit 220 by the electrical connector 236 and electrical contact 238. More particularly, electrical power may be received by electrical connector 236 from power line 230 and transmitted through electrical contact 238, through conductor 244, and to electrical contact 246. In various embodiments, electrical contact 238 is a socket and electrical connector 236 is a plug. However, electrical contact 238 and electrical connector 236 may be formed as any suitable electrical connection type. As described herein, trailer coupler 202 may be electrically coupled to ball hitch 204 via electrical contact 246 in response to trailer coupler 202 being installed onto ball hitch 204 for transmitting electrical power to an electronics system onboard a trailer, as described in further detail herein.

Electrical contact 238 may be disposed on hitch portion 262. Electrical contact 238, electrical contact 246, and conductor 244 may be electrically insulated from the ball portion 260 and the hitch portion 262. Ball portion 260 may comprise a bore 264 extending through the ball portion 260. Conductor 244 may be disposed at least partially within the bore 264.

Figure 3B:
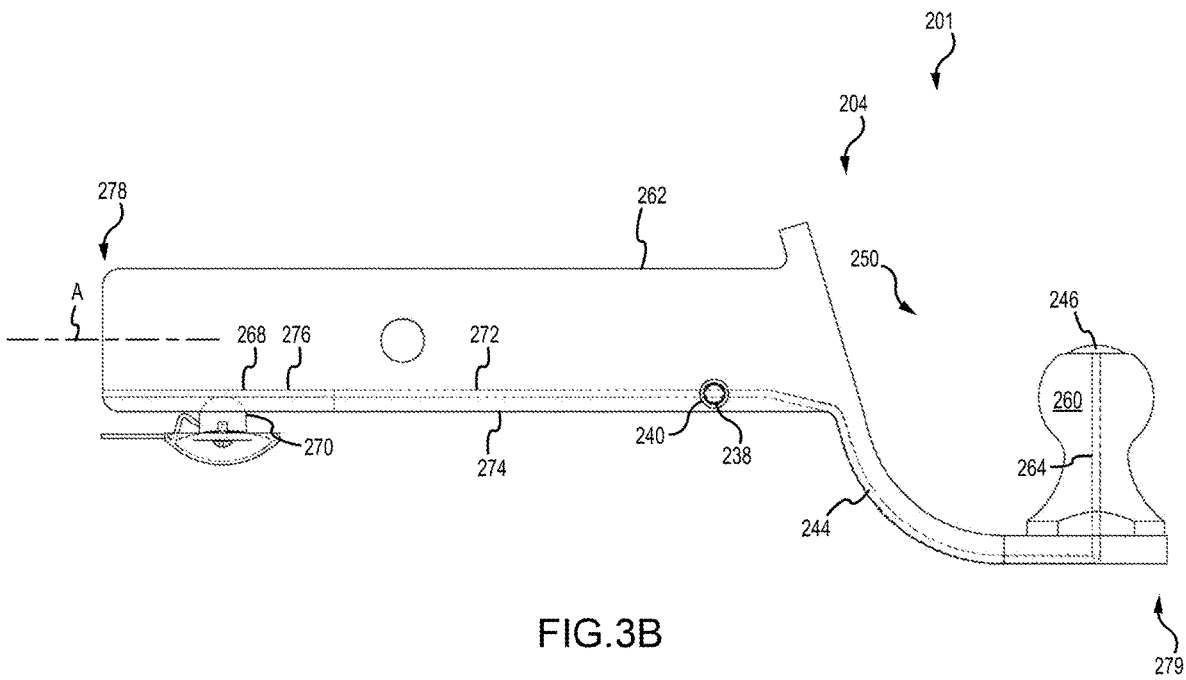
FIG. 3B illustrates an isolated view of the power through ball hitch in an installed position and in contact with an electrical contact of FIG. 3A, with the power through hitch receiver omitted for clarity purposes, in accordance with various embodiments.
Figure 4:
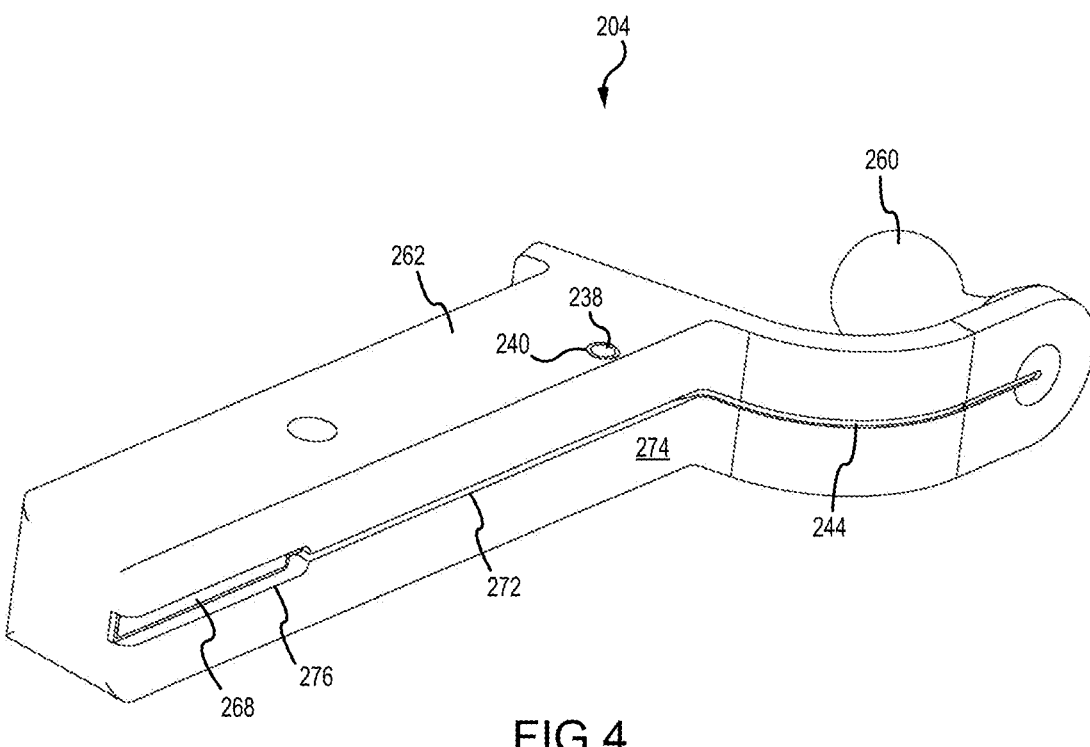
FIG. 4 illustrates a perspective view of the underside portion of a power through ball hitch, in accordance with various embodiments.

FIG. 3B illustrates electrical contact 268 connected with electrical contact 270 with hitch receiver 206 (see FIG. 3A) omitted for clarity purposes. FIG. 4 illustrates a perspective view of the underside portion of ball hitch 204. With combined reference to FIG. 3B and FIG. 4, ball hitch 204 may further comprise a recessed channel 272 disposed in the hitch portion 262. Recessed channel 272 may be disposed in an underside surface 274 of hitch portion 262. Conductor 244 may be disposed in channel 272. In this manner, conductor 244 is embedded in ball hitch 204 so as to not interfere with the mechanical fit of ball hitch 204 into a hitch receiver and further to protect conductor 244. Electrical contact 268 may be disposed in channel 272.

Ball hitch 204 may comprise a first end 278 (also referred to herein as a forward end) and a second end 279 (also referred to herein as a rear end). Ball portion 260 may be mounted to second end 279. Channel 272 may comprise a widened portion 276 configured and sized to receive electrical contact 270. Widened portion 276 may be disposed at first end 278. In this regard, electrical contact 270 may extend into ball hitch 204 (i.e., past underside surface 274) to contact electrical contact 268. As ball hitch 204 is slid into hitch receiver 206 (see FIG. 3A), electrical contact 270 may move into channel 272 from first end 278 of ball hitch 204 parallel longitudinal axis A to an installed position. In various embodiments, electrical contact 268 comprises an elongated metal plate oriented along longitudinal axis A.

Having described various systems and methods for supplying electric power to electrical contact 246, focus is now turned to the electrical connection formed by electrical contact 246 with trailer coupler 202.

Figure 5A:
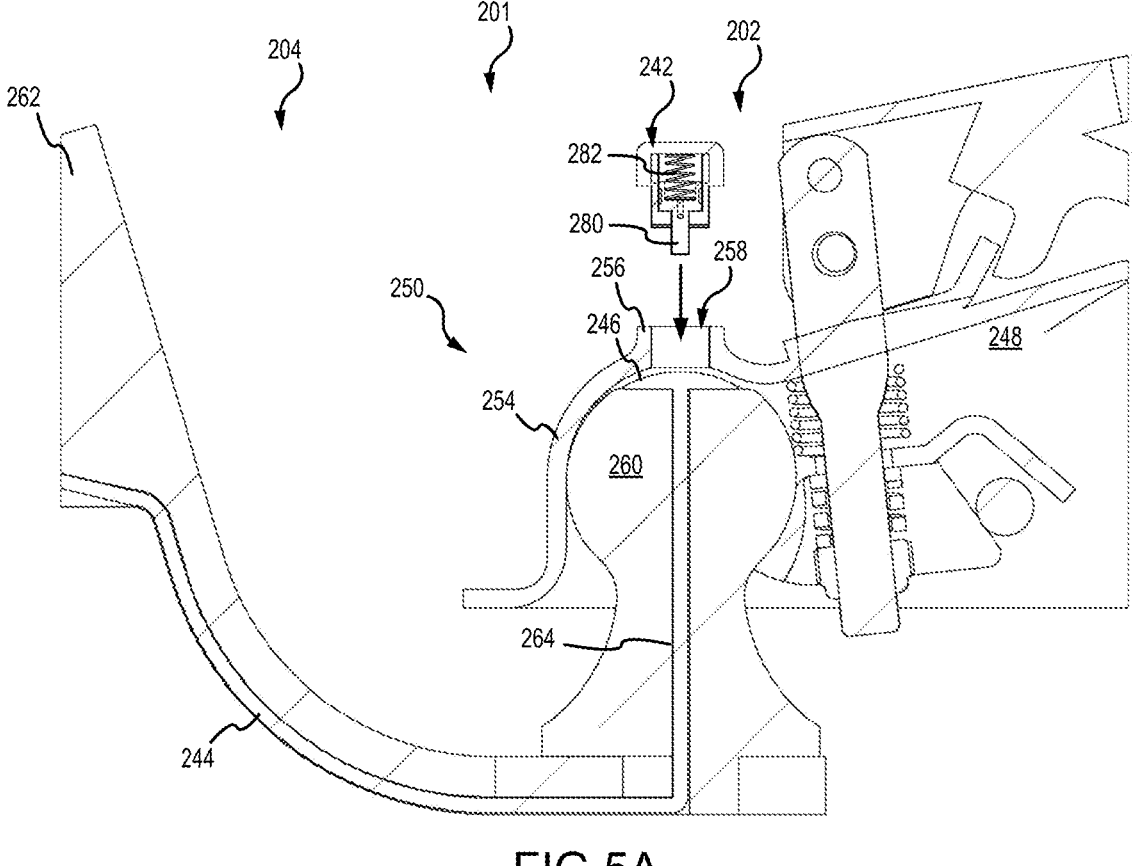
FIG. 5A and FIG. 5B illustrate section views of a power through trailer coupler installed onto a power through ball hitch with an electrical connector in an assembly view and an installed position, respectively, in accordance with various embodiments.

FIG. 5A illustrates a section view of power through trailer hitch system 201, in accordance with various embodiments. More particularly, FIG. 5A illustrates a section view of trailer coupler 202 mounted to ball hitch 204 with an assembly view of electrical connector 242. In FIG. 5A, electrical connector 242 is removed from trailer coupler 202.

With combined reference to FIG. 2 and FIG. 5A, in various embodiments, trailer coupler 202 comprises a body 248 having forward end portion 250, a rear end portion 252, and a downwardly opening socket 254 at the forward end portion 250 of body 248. Trailer coupler 202 may comprise a flange 256 defining an opening 258 into the downwardly opening socket 254. Electrical connector 242 may be configured to be coupled to trailer coupler 202 at flange 256. Electrical connector 242 may be disposed at least partially in the opening 258 (e.g., see FIG. 5B) in an installed position.

Figure 5B:
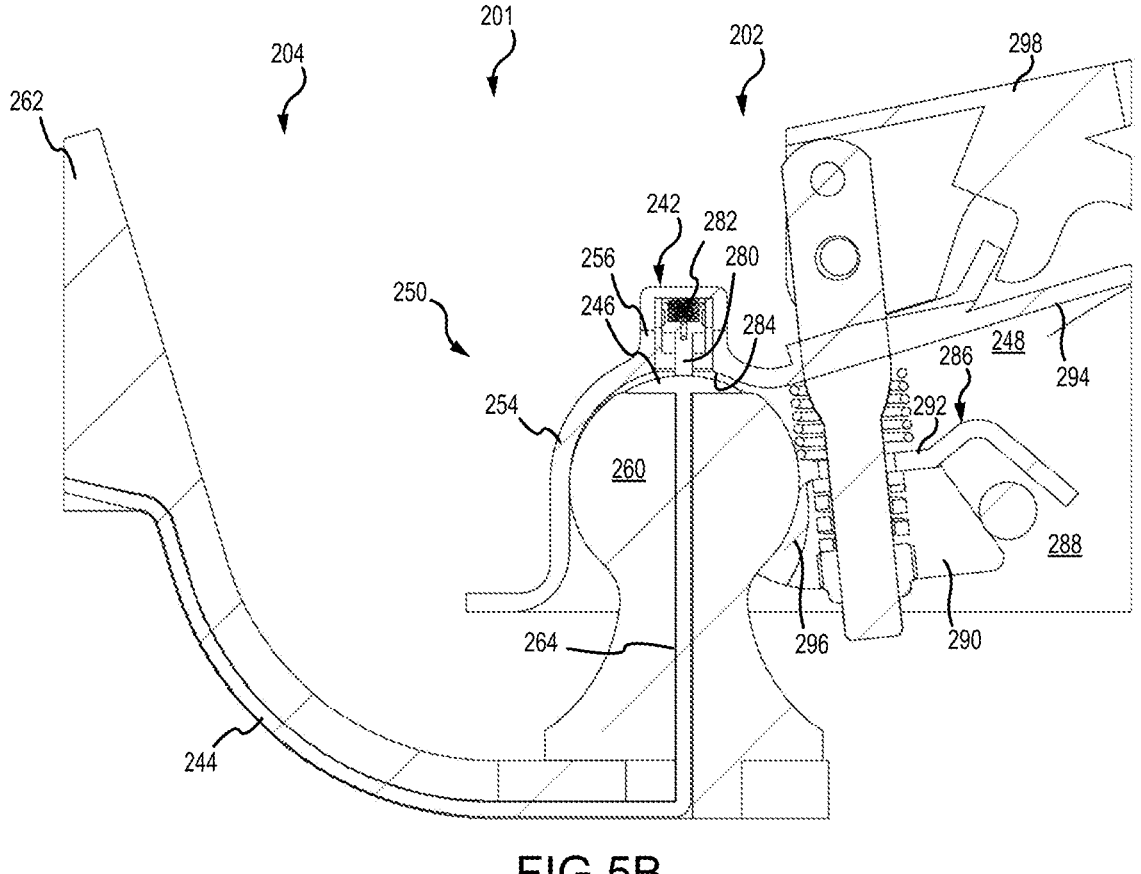

FIG. 5B illustrates a section view of power through trailer hitch system 201 with electrical connector 242 in an installed position, in accordance with various embodiments. With combined reference to FIG. 2 and FIG. 5B, electrical connector 242 is configured to contact ball hitch 204 in response to ball portion 260 of the ball hitch 204 being moved into the downwardly opening socket 254. More particularly, electrical connector 242 is configured to contact electrical contact 246 in response to ball portion 260 of the ball hitch 204 being moved into the downwardly opening socket 254. The electrical connector 242 is configured for receiving electrical power from a tow vehicle via electrical contact 246 of ball hitch 204. Said electrical power may be transmitted from connector 242 to control unit 220 for distributing said electrical power to one or more electronics system onboard a trailer (e.g., trailer brakes 106, running lights 108, brake lights 110, etc. of FIG. 1).

In various embodiments, electrical connector 242 may comprise a moveable contactor 280 moveable between a compressed position (see FIG. 5B) and an extended position (see FIG. 5A). Electrical connector 242 may further comprise a biasing member 282, such as a spring for example, configured to bias the moveable contactor 280 toward the extended position. In response to ball portion 260 being moved into the downwardly opening socket 254, moveable contactor 280 may contact electrical contact 246, thereby forming an electrical power connection (e.g., see power connection 116 of FIG. 1) between a tow vehicle (e.g., truck 104 of FIG. 1) and a trailer (e.g., trailer 102 of FIG. 1). Providing moveable contactor 280 may allow for movement between electrical contact 246 and trailer coupler 202 without breaking the electrical connection between ball hitch 204 and trailer coupler 202 (i.e., without breaking the electrical connection between electrical contact 246 and electrical connector 242). In this manner, moveable contactor 280 may extend and contract as ball portion 260 moves with respect to downwardly opening socket 254. In various embodiments, moveable contactor 280 may extend past an interior surface 284 of the downwardly opening socket 254 in the extended position to contact electrical contact 246.

In various embodiments, socket 254 is shaped to receive and conform closely to ball portion 260. The rear side of socket 254 may be open and adapted to be selectively closed by a ball clamp 286. As shown most clearly in FIG. 5B, the ball clamp 286 may be located within the body 248 between the side walls 288 thereof. The ball clamp 286 may also comprise a member of inverted U-shaped cross-section. Thus, the ball clamp 286 may comprise two transversely spaced side walls 290 having upper margins formed integrally with a top wall 292 which is spaced below the inclined top wall 294 of the body 248. The forward end portion of the ball clamp 286 may include a clamping plate 296 which is curved in accordance with the curvature of the ball portion 260 so as to enable the clamping plate 296 to conform closely to the ball portion 260.

In various embodiments, ball clamp 286 may be supported by body 248 and configured to move back and forth between clamped and released positions. Ball clamp 286 may be operable when in the clamped position to close the rear side of the socket 254 and lock the ball portion 260 in the socket 254. Ball clamp 286 may be operable when in the released position to permit the socket 254 to be pulled upwardly off of the ball portion 260. Trailer coupler 202 may be equipped with a handle 298 for manually moving the ball clamp 286 between the clamped and released positions. It should be understood that a trailer coupler 202 as disclosed herein may include various types of ball clamps for locking ball hitch 204 in socket 254 and the ball clamp 286 is therefore not particularly limited in this regard.

With reference again to FIG. 2, control unit 220 may be configured to communicate with control unit 224. Control unit 220 may comprise a transceiver 222 whereby control unit 220 communicates with control unit 224. Likewise, control unit 224 may comprise a transceiver 226 whereby control unit 224 communicates with control unit 220. In this regard, control unit 220 and control unit 224 may communicate via a wireless communications channel implemented using, for example, a radio frequency (RF) link, Wi-Fi, Wi-Fi HaLow (IEEE 802.11ah), near-field communication (NFC), Bluetooth, Bluetooth Low Energy, LoRa or other wireless communication channel. Each control unit 220, 224 may comprise a unique identifier, such as a radio frequency identifier (RFID) for example, whereby control unit 220 and control unit 224 may be paired together to prevent interference from other communications channels.

In various embodiments, the control unit 220 detects that a trailer is coupled to ball hitch 204 by detecting an electrical connection between electrical contact 246 and electrical connector 242. Control unit 220 may detect that trailer coupler 202 is coupled to ball hitch 204 in response to receiving a power signal (also referred to herein as a test signal) from control unit 224. In response to detecting that trailer coupler 202 is coupled to ball hitch 204, control unit 220 may send a wireless signal to control unit 224 (e.g., via transceiver 222 and transceiver 226) to indicate to control unit 224 to send a full power signal (e.g., a 12 volt DC power signal) to electrical contact 246 for powering the electronics onboard a trailer associated with trailer coupler 202. In an example embodiment, control unit 224 may send a full power signal to electrical contact 246 comprising a 12 volt DC power signal, though other voltage levels are contemplated herein, such as 24V DC and 48V DC. Control unit 220 may receive the full power signal from electrical contact 246. Control unit 220 may further receive wireless control signals (e.g., via transceiver 222 and transceiver 226) from control unit 224 so that control unit 224 can distribute the electrical power to the appropriate trailer electronic system (s) (e.g., to control trailer brakes 106, running lights 108, brake lights 110, etc. of FIG. 1).

Although described as control unit 220 detecting that a trailer is coupled to ball hitch 204, it is similarly contemplated that control unit 224 may detect the coupling (i.e., an electrical connection between electrical contact 246 and electrical connector 242). Control unit 224 may subsequently send the full power signal to trailer coupler 202 in response to detecting the coupling.

The connection between electrical contact 246 and electrical connector 242 may be detected by control unit 220 and/or control unit 224 by detecting a flow of current through electrical contact 246 and electrical connector 242 (e.g., a flow of electrical current from control unit 224 to control unit 220). In this regard, control unit 224 may be configured to periodically (or continuously) send a low voltage power signal (e.g., a test signal) to electrical contact 246 to determine whether electrical contact 246 is connected with electrical connector 242. Control unit 220 and/or control unit 224 may detect that trailer coupler 202 is connected when electric current flows between electrical contact 246 and electrical connector 242. Conversely, control unit 220 and/or control unit 224 may detect that trailer coupler 202 is not connected when electric current does not flow through electrical contact 246. Electric current through electrical contact 246 may be detected using any suitable method, such as via a current meter for example, among others. In various embodiments, the test signal comprises a low voltage signal compared to the full power signal. In this manner, an electrical hazard may be prevented when electrical contact 246 is not yet connected to trailer coupler 202. For example, electrical contact 246 may be exposed before being connected to trailer coupler 202. In various embodiments, a cover may be provided over electrical contact 246 when trailer coupler 202 is not connected with electrical contact 246 to prevent unwanted contact with electrical contact 246.

In various embodiments, instead of receiving wireless control signals, control unit 220 may receive control signals from control unit 224 over the power line (e.g., via electrical contact 246). Stated differently, control unit 220 may receive power line communication (PLC), whereby control unit 224 sends data over the power lines. Power line communication, as used herein, may refer to the transmission of data on a conductor (e.g., via electric contact 270 of hitch receiver 206 and/or via conductor 244 of ball hitch 204) that is also used simultaneously for electric power transmission or electric power distribution (e.g., a 12 volt DC power signal) to trailer coupler 202. In this regard, control unit 220 may receive both electric power and data signals from control unit 224 via electrical contact 246 for powering electronics onboard a trailer and also for controlling when and where the electric power is distributed (e.g., to control trailer brakes 106, running lights 108, brake lights 110, etc. of FIG. 1), in accordance with various embodiments.

Figure 6:
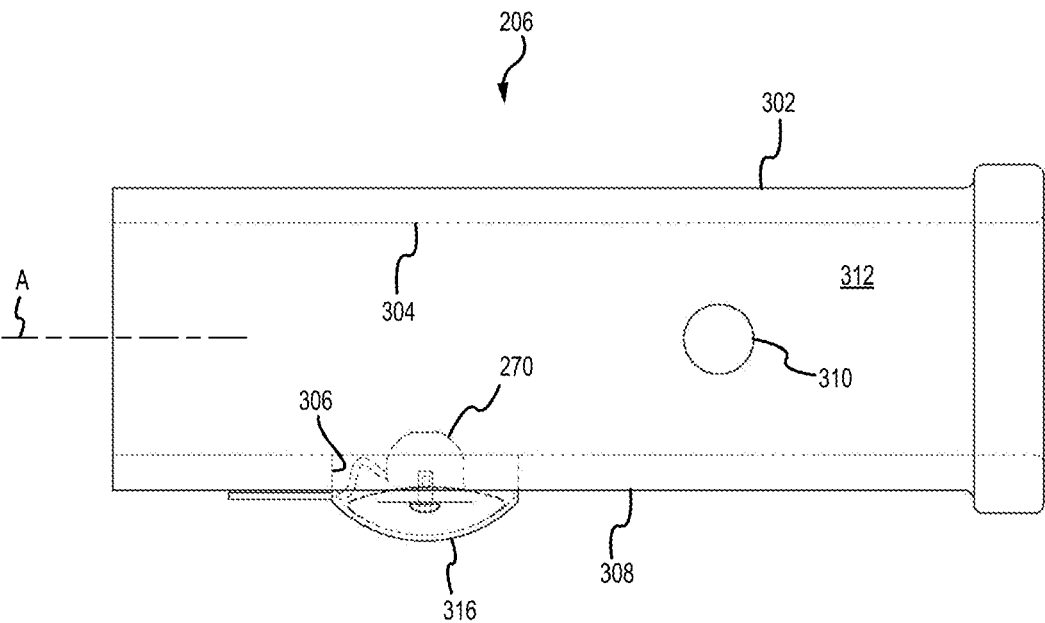
FIG. 6 illustrates a side view of a power through hitch receiver, in accordance with various embodiments.

With reference to FIG. 6, a side view of hitch receiver 206 is illustrated, in accordance with various embodiments. Hitch receiver 206 may comprise an elongated body 302 defining an opening 304 shaped to receive and conform closely to ball hitch 204 (see FIG. 2). Opening 304 may comprise a generally square geometry. Hitch receiver 206 may include an opening 306 for receiving electrical contact 270. Electrical contact 270 may extend into opening 304. In various embodiments, opening 306 is disposed at an underside surface 308 of body 302. Electrical contact 270 may be mounted to hitch receiver 206 via a housing 316. Housing 316 may be located externally from opening 304. Hitch receiver 206 may further comprise a through hole 310 extending through both side surfaces 312 of body 302. Through hole 310 may be configured to receive a pin 314 (see FIG. 2) for securing ball hitch 204 (see FIG. 2) to hitch receiver 206.

Figure 7A:
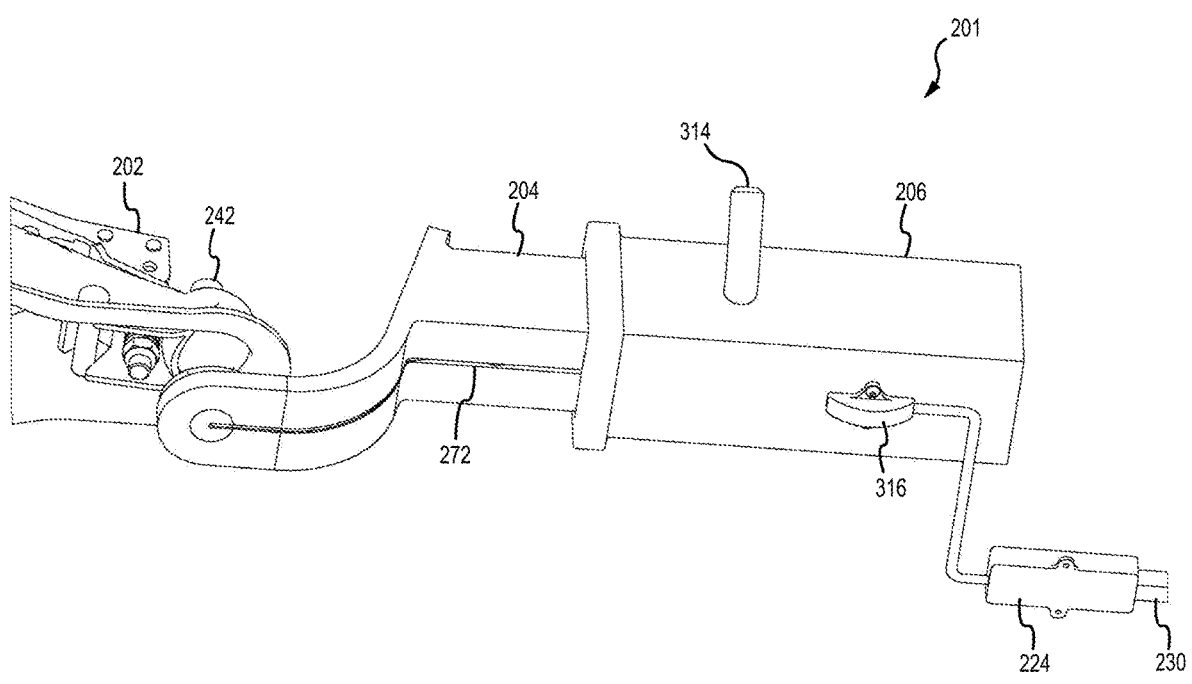
FIG. 7A illustrates a perspective view of the underside of a power through trailer hitch system, in accordance with various embodiments.
Figure 7B:
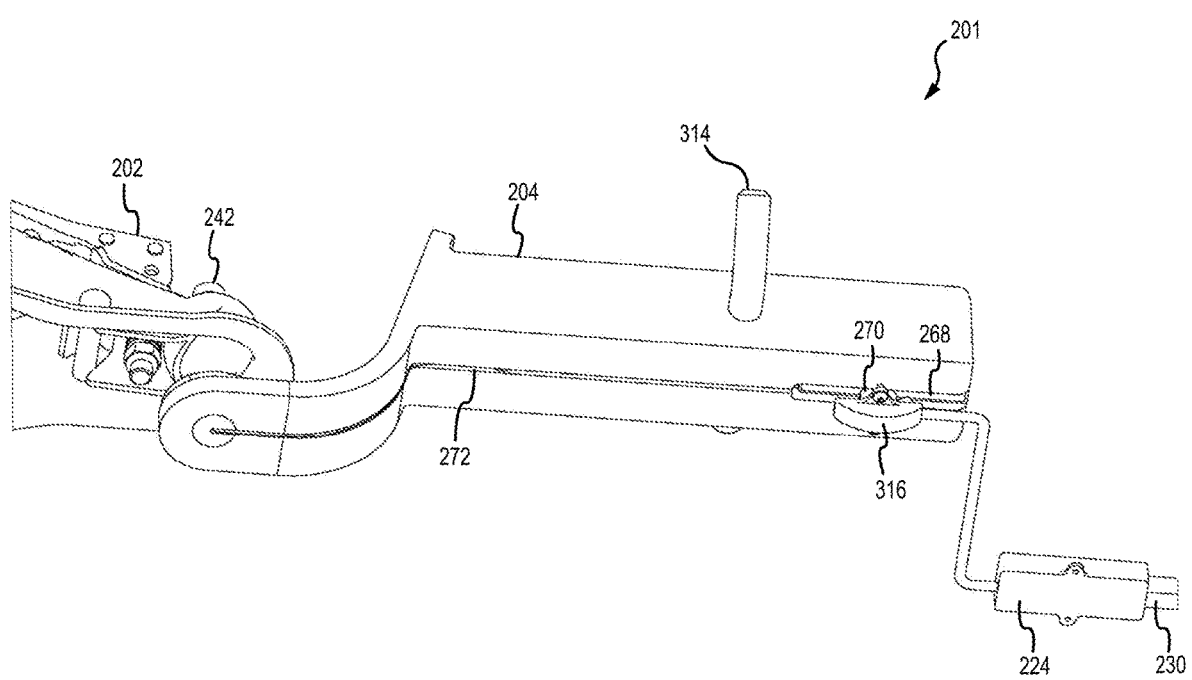
FIG. 7B illustrates a perspective view of the underside of the power through trailer hitch system of FIG. 7A, with the power through hitch receiver omitted for clarity purposes, in accordance with various embodiments.

With reference to FIG. 7A and FIG. 7B, perspective views of the underside of power through trailer hitch system 201 are illustrated, in accordance with various embodiments. In FIG. 7B, the hitch receiver 206 is omitted for clarity purposes. With respect to FIG. 7A and FIG. 7B, elements with like element numbering, as depicted in FIG. 2 through FIG. 6, are intended to be the same and will not necessarily be repeated for the sake of clarity.

Various components of power through trailer hitch system 201 may be made from a metal or metal alloy, such as cast iron, steel, stainless steel, austenitic stainless steels, ferritic stainless steels, martensitic stainless steels, titanium, titanium alloys, aluminum, aluminum alloys, galvanized steel, or any other suitable metal or metal alloy. In this regard, hitch receiver 206, ball hitch 204, and/or trailer coupler may be made from a metal or metal alloy.

Figure 8:
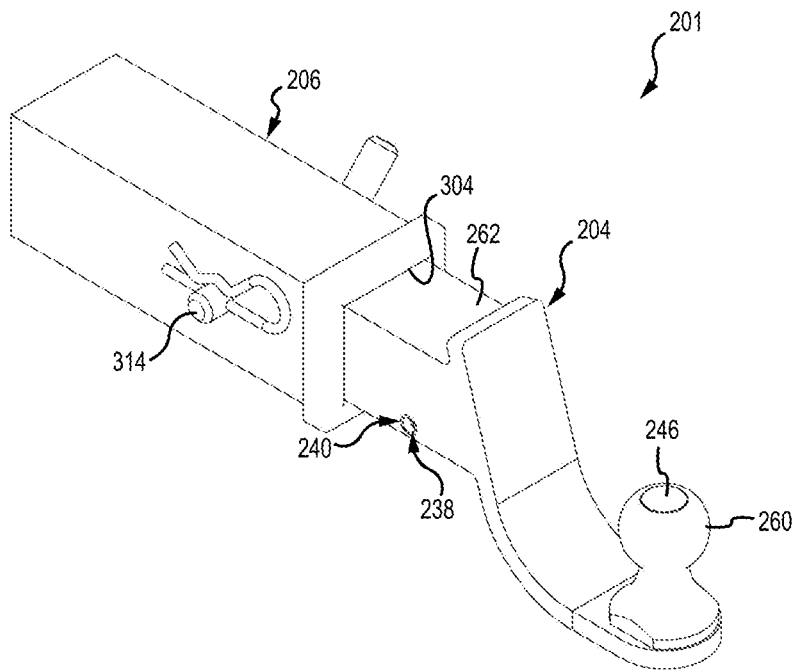
FIG. 8 illustrates a perspective view of a power through ball hitch installed in a power through hitch receiver, in accordance with various embodiments.

With reference to FIG. 8, a perspective view of ball hitch 204 installed in hitch receiver 206 is illustrated, in accordance with various embodiments. With respect to FIG. 8, elements with like element numbering, as depicted in FIG. 2 through FIG. 7B, are intended to be the same and will not necessarily be repeated for the sake of clarity.

Figure 9:
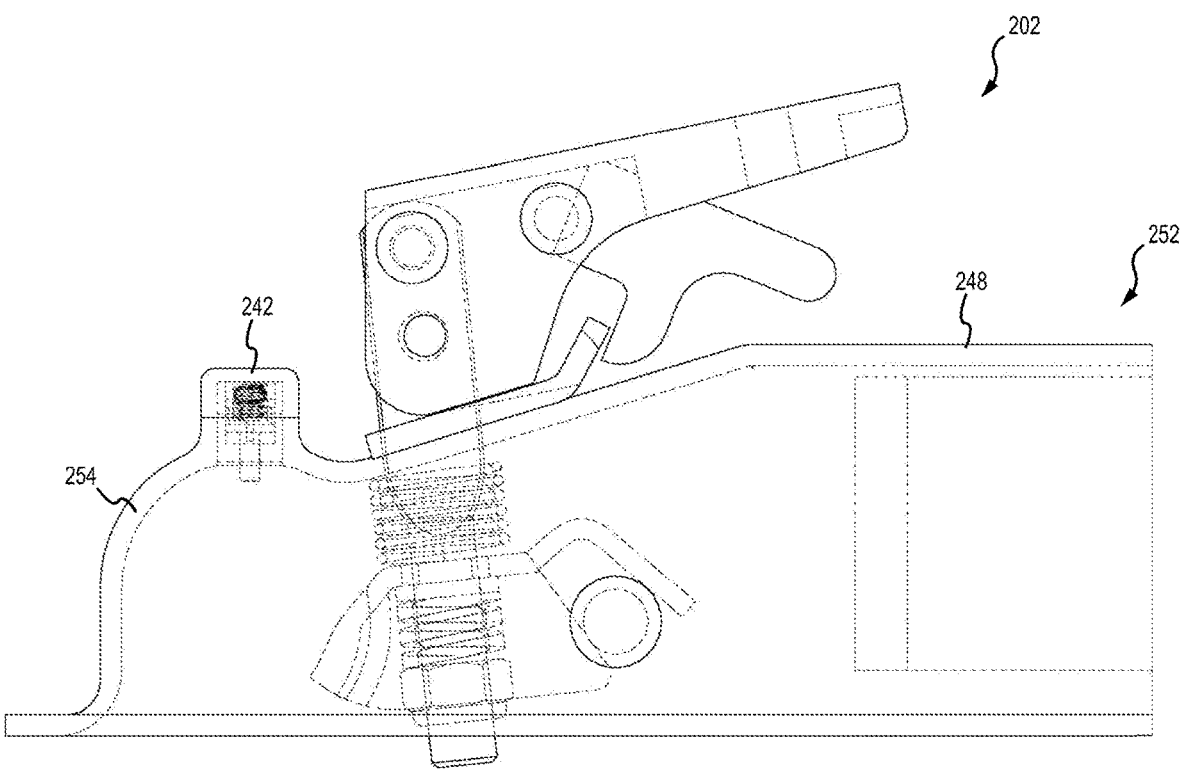
FIG. 9 illustrates a side view of a power through trailer coupler (also referred to as a trailer tongue), in accordance with various embodiments.

With reference to FIG. 9, a side view of trailer coupler 202 is illustrated, in accordance with various embodiments. With respect to FIG. 9, elements with like element numbering, as depicted in FIG. 2 through FIG. 8, are intended to be the same and will not necessarily be repeated for the sake of clarity. Rear end portion 252 of trailer coupler body 248 may be configured to be coupled to a front end of a trailer for coupling the trailer to a tow vehicle.

Figure 10A:
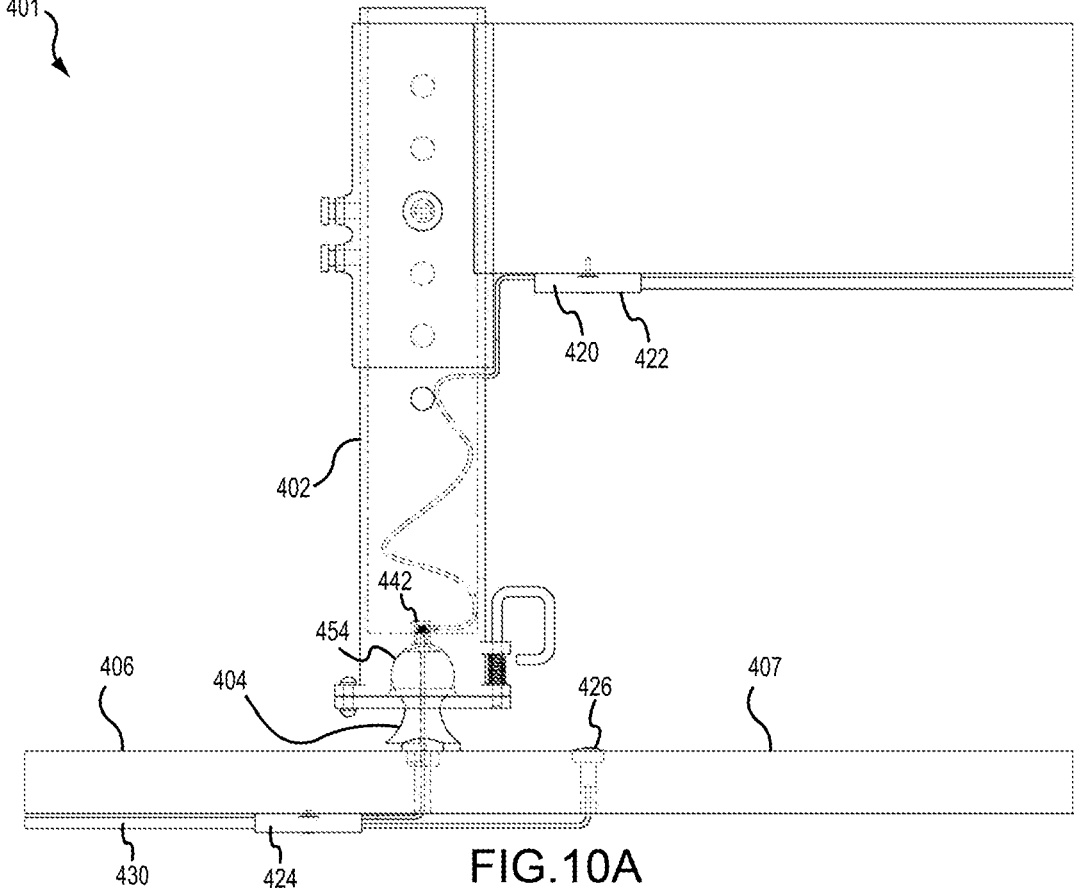
FIG. 10A illustrates a power through trailer hitch system with a trailer coupler coupled to a power through ball hitch, in accordance with various embodiments.

With reference to FIG. 10A, a trailer hitch system 401 (also referred to herein as a power through trailer hitch system) is illustrated, in accordance with various embodiments. In various embodiments, power through trailer hitch system 401 is similar to power through trailer hitch system 101 of FIG. 1. Power through trailer hitch system 401 may be configured as a gooseneck hitch system. Power through trailer hitch system 401 may include a trailer coupler 402 (also referred to herein as a gooseneck tongue). Trailer coupler 402 may be configured to be coupled to the forward end of a trailer (e.g., trailer 102 of FIG. 1). Power through trailer hitch system 401 may further include a ball hitch 404 (also referred to herein as a power through ball hitch). Trailer coupler 402 may be secured to ball hitch 404 when coupling a trailer to a truck for towing. Ball hitch 404 may be configured to be coupled to a body 406 of a tow vehicle. Ball hitch 404 may be coupled to the bed of the tow vehicle, the bumper of the tow vehicle, or any other suitable portion of the tow vehicle for towing a trailer. In this regard, body 406 may be a bed, a bumper, a frame, a chassis, or any other suitable portion of the tow vehicle. Ball hitch 404 may be configured to be removably coupled to body 406. Ball hitch 404 may be received at least partially into a downwardly opening socket 454 of trailer coupler 402 for coupling ball hitch 404 to trailer coupler 402.

During operation, a power line 430 may supply electrical power from a power distribution module onboard a tow vehicle (e.g., power distribution module 118 of FIG. 1) to power through trailer hitch system 401. Power through trailer hitch system 401 may comprise a control unit 424. Control unit 424 may be similar to control unit 124 of FIG. 1, in accordance with various embodiments. Control unit 424 may be mounted to body 406. Power through trailer hitch system 401 may comprise a transceiver 426. Transceiver 426 may be similar to transceiver 126 of FIG. 1, in accordance with various embodiments. Transceiver 426 may be coupled to body 406. In various embodiments, transceiver 426 may be coupled to an exposed surface 407 of body 406 to place transceiver 426 in close proximity to transceiver 422. For example, transceiver 426 may be positioned rearward from ball hitch 404, in accordance with various embodiments.

Power through trailer hitch system 401 may comprise a control unit 420. Control unit 420 may be similar to control unit 120 of FIG. 1, in accordance with various embodiments. Control unit 420 may be mounted to a trailer (e.g., see trailer 102 of FIG. 1). Power through trailer hitch system 401 may comprise a transceiver 422. Transceiver 422 may be similar to transceiver 122 of FIG. 1, in accordance with various embodiments. Transceiver 422 may be mounted to a trailer (e.g., see trailer 102 of FIG. 1). In various embodiments, transceiver 422 may be coupled to the trailer such that transceiver 422 is in close proximity to transceiver 426 when trailer coupler 402 is coupled to ball hitch 404.

Figure 10B:
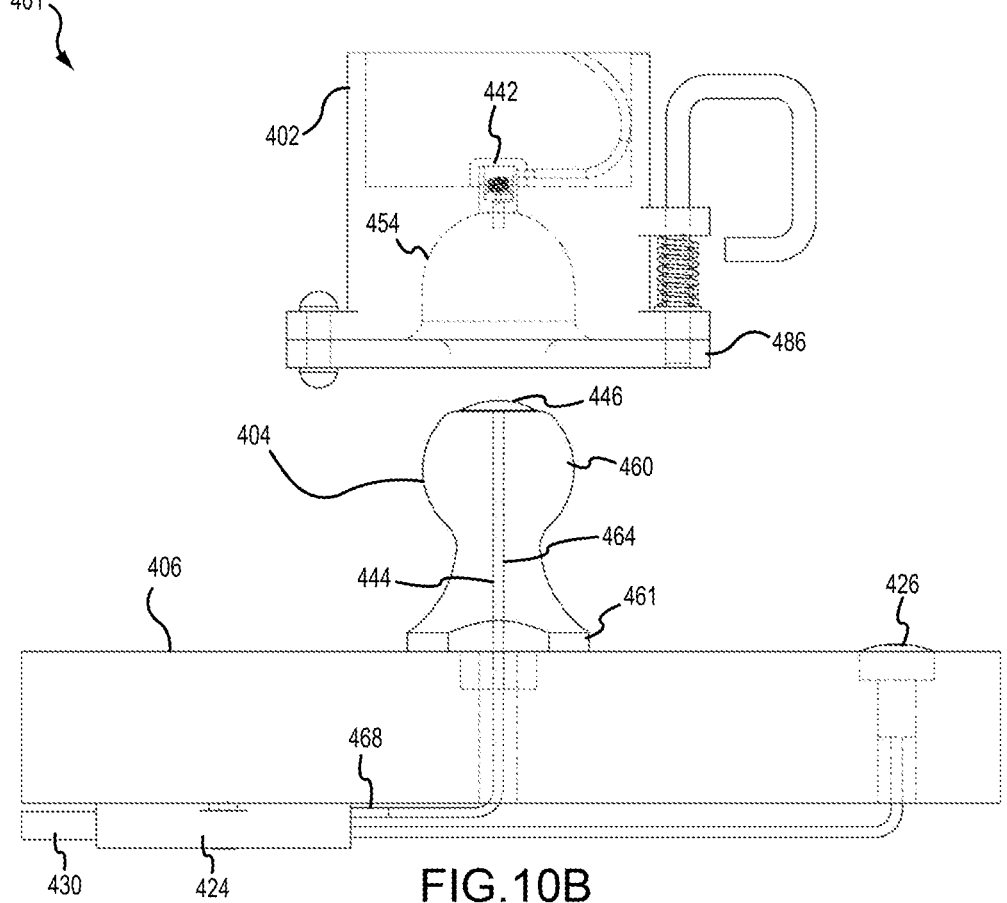
FIG. 10B illustrates an enlarged view of the power through trailer hitch system of FIG. 10A with the trailer coupler decoupled from the power through ball hitch, in accordance with various embodiments.

With reference to FIG. 10B, trailer coupler 402 and ball hitch 404 are illustrated with the trailer coupler 402 decoupled from ball hitch 404, in accordance with various embodiments. Ball hitch 404 may comprise a ball portion 460. Ball portion 460 may comprise a hitch ball. Ball portion 460 may comprise a base portion 461 configured to couple with body 406. In various embodiments, base portion 461 may be threadingly coupled with body 406. In various embodiments, base portion 461 may be coupled to body 406 with a pinned connection (e.g., similar to pin 314 of FIG. 2). Base portion 461 may be coupled to body 406 via any suitable method, in accordance with various embodiments. Ball hitch 404 may comprise a bore 464 extending through the ball portion 460. In various embodiments, bore 464 extends through the central longitudinal axis of ball hitch 404. Bore 464 may extend through ball portion 460 and base portion 461. Ball hitch 404 may further comprise a conductor 444 extending through bore 464. Ball hitch 404 may further comprise an electrical contact 468 (also referred to herein as a second electrical contact). Conductor 444 may be electrically connected with control unit 424 by electrical contact 468. Ball hitch 404 may further comprise an electrical contact 446 (also referred to herein as a first electrical contact). Electrical contact 446 may be coupled to ball portion 460. Electrical contact 446 may be electrically coupled with conductor 444. During operation, electrical contact 446 may receive electrical power from power line 430.

Trailer coupler 402 may comprise an electrical connector 442. In various embodiments, electrical connector 442 is similar to electrical connector 242 of FIG. 2, FIG. 5A, and FIG. 5B. In response to trailer coupler 402 being installed onto ball portion 460, electrical connector 442 may form an electrical connection with electrical contact 446 whereby electric power is transmitted. Moreover, trailer coupler 402 may comprise a ball clamp 486 configured to move back and forth between clamped and released positions. Ball clamp 486 may be operable when in the clamped position to close an open side of the socket 454 and lock the ball portion 460 in the socket 454. Ball clamp 486 may be operable when in the released position to permit the socket 454 to be pulled upwardly off of the ball portion 460. It should be understood that a trailer coupler 402 as disclosed herein may include various types of ball clamps for locking ball hitch 404 in trailer coupler 402 and the ball clamp 486 is therefore not particularly limited in this regard.

With reference to FIG. 11, a method 500 for powering a trailer is provided, in accordance with various embodiments. Method 500 includes sending a test signal from a transmitting unit on a tow vehicle to a power through hitch (step 510). Method 500 includes attaching a power through trailer tongue of a trailer to the power through hitch (step 520). Method 500 includes receiving the test signal at a trailer receiver unit (step 530). Method 500 includes sending a connection signal from the trailer receiver unit to the transmitting unit on the tow vehicle (step 540). Method 500 includes sending full electrical power from the transmitting unit to the power through hitch (step 550). Method 500 includes sending the full electrical power to an electronic component on the trailer by the receiver unit (step 560).

With combined reference to FIG. 1 and FIG. 11, step 510 may include sending a test signal from a control unit 124 to electrical conductor 114. Step 520 may include attaching electrical conductor 111 of trailer 102 to electrical conductor 114 of truck 104. Step 530 may include receiving the test signal at control unit 120. The test signal may comprise a voltage signal and/or a current signal. Step 540 may include sending a connection signal from control unit 120 to control unit 124. The connection signal may be sent wirelessly from transceiver 122 of control unit 120 to transceiver 126 of control unit 124. Step 550 may include sending full electrical power from control unit 124 to control unit 120 through connection 116. Step 560 may include sending the full electrical power to an electronic component (e.g., trailer brakes 106, running lights 108, and/or brake lights 110) on the trailer 102 by control unit 120.

With combined reference to FIG. 2, FIG. 3A, and FIG. 11, step 510 may include sending a test signal from a control unit 224 to electrical contact 246. The test signal may be sent to electrical contact 246 by electrical contact 270 and/or by electrical connector 236. Step 520 may include attaching trailer coupler 202 to ball hitch 204 (i.e., by moving ball portion 260 into socket 254). Electrical contact 246 may automatically form an electrical connection with electrical connector 242 when ball portion 260 is moved into socket 254 (e.g., when trailer coupler 202 is dropped onto ball hitch 204). Step 530 may include receiving the test signal at control unit 220. Step 540 may include sending a connection signal from control unit 220 to control unit 224. The connection signal may be sent wirelessly from transceiver 222 of control unit 220 to transceiver 226 of control unit 224. Step 550 may include sending full electrical power from control unit 224 to control unit 220 through electrical contact 246. Step 560 may include sending the full electrical power to an electronic component (e.g., trailer brakes 106, running lights 108, and/or brake lights 110 of FIG. 1) on the trailer 102 (see FIG. 2) by control unit 220.

With combined reference to FIG. 10A, FIG. 10B, and FIG. 11, step 510 may include sending a test signal from a control unit 424 to electrical contact 446. The test signal may be sent to electrical contact 446 by conductor 444. Step 520 may include attaching trailer coupler 402 to ball hitch 404 (i.e., by moving ball portion 460 into socket 454). Electrical contact 446 may automatically form an electrical connection with electrical connector 442 when ball portion 460 is moved into socket 454 (e.g., when trailer coupler 402 is dropped onto ball hitch 404). Step 530 may include receiving the test signal at control unit 420. Step 540 may include sending a connection signal from control unit 420 to control unit 424. The connection signal may be sent wirelessly from transceiver 422 of control unit 420 to transceiver 426 of control unit 424. Step 550 may include sending full electrical power from control unit 424 to control unit 420 through electrical contact 446. Step 560 may include sending the full electrical power to an electronic component (e.g., trailer brakes 106, running lights 108, and/or brake lights 110 of FIG. 1) on the trailer 102 (see FIG. 2) by control unit 420.

In various embodiments, step 540 may include sending a connection signal from control unit 420 to control unit 424 via electrical connector 242 (see FIG. 2) or electrical connector 442 (see FIG. 10A) using power line communication (PLC).

Although described herein with respect to a wheeled vehicle, it is contemplated herein that a power through hitch system of the present disclosure may similarly be used for non-wheeled hitch attachments/accessories, including but not limited to, bike racks, tire carriers, power inverters, external additional batteries for electric vehicles that boost range, and electric cooktops. For example, a bike rack may be powered for charging an electric bike, a tire carrier may include additional running lights or brake lights, a power inverter may be plugged into the hitch receiver, and an electric cooktop may be used for outdoor cooking. With respect to FIG. 12, elements with like element numbering, as depicted in FIG. 2 through FIG. 4, are intended to be the same and will not necessarily be repeated for the sake of clarity.

Figure 12:
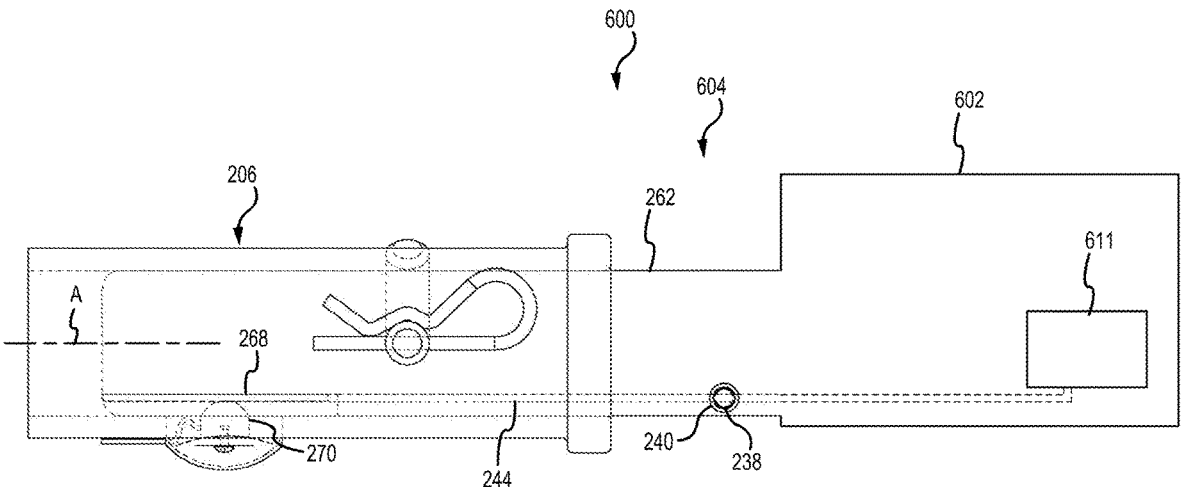
FIG. 12 illustrates an isolated view of a non-wheeled power through hitch installed onto a power through hitch receiver, in accordance with various embodiments.

With reference to FIG. 12, an isolated view of an electric power system 600 for a truck (e.g., truck 104 of FIG. 1) including a hitch receiver 206 and a non-wheeled attachment 602 (also referred to herein as a trailer) is illustrated, in accordance with various embodiments. Non-wheeled attachment 602 is schematically represented in the illustrated embodiment and may be a powered attachment such as a bike rack, a tire carrier, a power inverter, an external battery, a cargo tray, an electric cooktop, or any other suitable non-wheeled attachment suitable for mounting to a truck.

In various embodiments, electric power system 600 may include a hitch 604 installed onto hitch receiver 206 is illustrated, in accordance with various embodiments. Hitch 604 may comprise non-wheeled attachment 602. Non-wheeled attachment 602 may be coupled to hitch receiver 206 with hitch portion 262. Non-wheeled attachment 602 may include onboard electronics 611. In various embodiments, onboard electronics 611 may comprise a light, a battery, a power inverter, or any other suitable electronics. Onboard electronics 611 may receive electric power from conductor 244. In various embodiments, onboard electronics 611 includes a control unit (e.g., control unit 120 (see FIG. 1) or control unit 220 (see FIG. 2)) and/or a transceiver (e.g., transceiver 122 (see FIG. 1) or transceiver 222 (see FIG. 2)).

Figure 13:
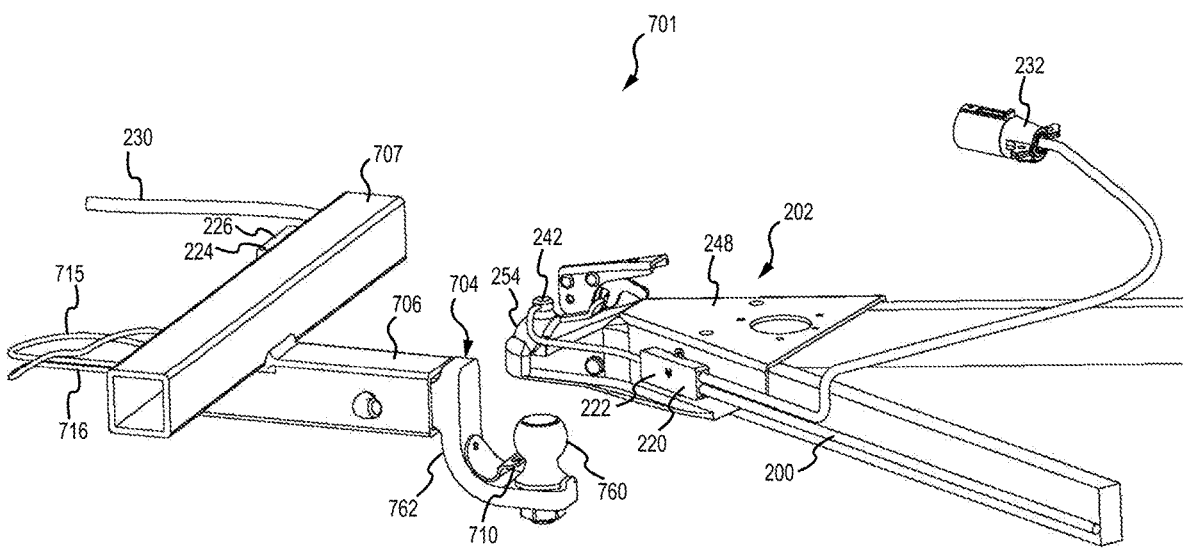
FIG. 13 illustrates a power through trailer hitch system, in accordance with various embodiments.

With reference to FIG. 13, a trailer hitch system 701 (also referred to herein as a power through trailer hitch system) is illustrated, in accordance with various embodiments. In various embodiments, power through trailer hitch system 701 is similar to power through trailer hitch system 201 of FIG. 2, except that the trailer hitch system 701 further includes additional grounding features (e.g., a grounding plate 710, adapter 712 (see FIG. 16A through FIG. 17C), etc.) at the truck-side of the trailer hitch system 701 for ensuring a continuous ground connection between the truck (e.g., via the ball hitch 704) and the trailer. The trailer-side of the trailer hitch system 701 is generally the same as that described with respect to FIG. 2. In this regard, with respect to FIG. 13, elements with like element numbering, as depicted in FIG. 2, are intended to be the same and will not necessarily be repeated for the sake of clarity.

Figure 14A:
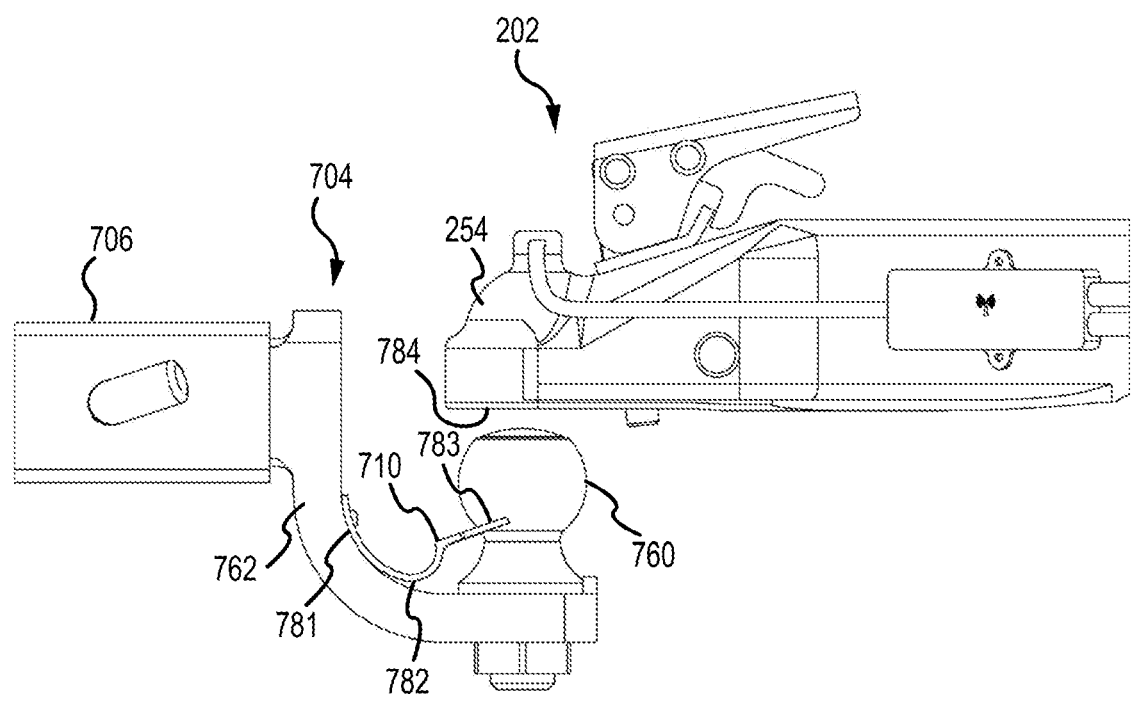
FIG. 14A illustrates the trailer coupler of FIG. 13 located above a ball hitch having a grounding plate, in accordance with various embodiments.
Figure 14B:
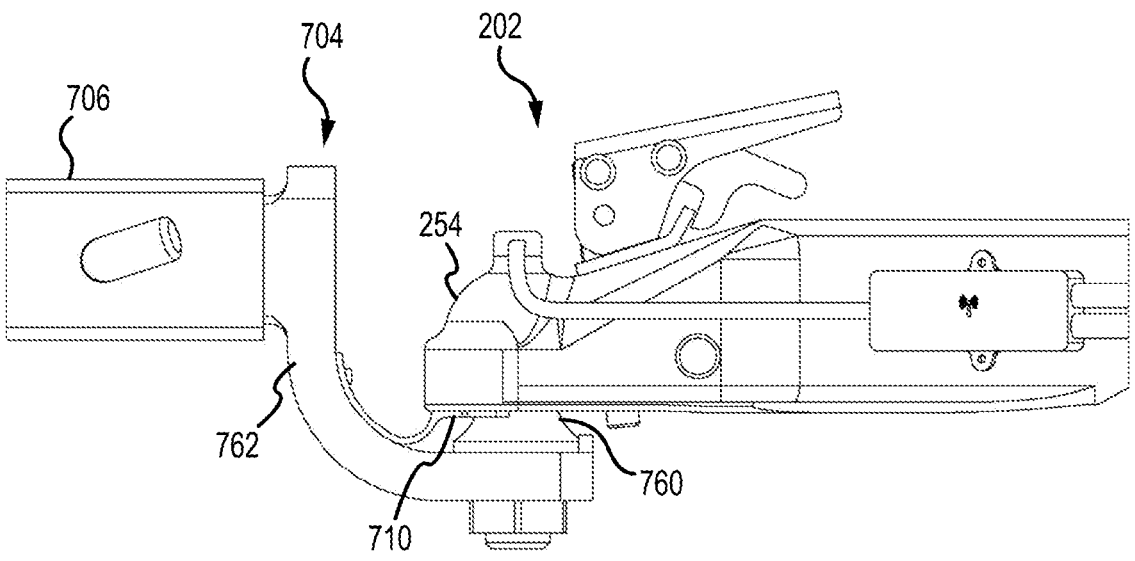
FIG. 14B illustrates the trailer coupler of FIG. 14A coupled to the ball hitch with the grounding plate contacting an underside of the trailer coupler socket, in accordance with various embodiments.

Power through trailer hitch system 701 may include a ball hitch 704 (also referred to herein as a power through ball hitch). Ball hitch 704 may include a ball portion 760 and a hitch portion 762. Ball portion 760 may be mounted to hitch portion 762. Ball portion 760 may comprise a hitch ball. Ball portion 760 may be configured to couple with trailer coupler 202. Trailer coupler 202 may be secured to ball hitch 704 when coupling a trailer to a truck for towing. With additional reference to FIG. 14A and FIG. 14B, a grounding plate 710 may be coupled to ball hitch 704 for bridging an electrical connection between ball hitch 704 and trailer coupler 202. Grounding plate 710 may be made from an electrically conductive material (e.g., copper, steel, steel alloys, stainless steel, etc.). Grounding plate 710 may be electrically coupled to hitch portion 762. Grounding plate 710 may be a flexible metallic member. Grounding plate 710 may be a flexible metallic plate. Grounding plate 710 may be made from a spring steel material. Grounding plate 710 may be configured to contact an underside of trailer coupler 202 in response to the trailer coupler 202 being installed over ball portion 760 (see FIG. 14B). Grounding plate 710 may be configured to contact the underside of socket 254 of trailer coupler 202 in response to the trailer coupler 202 being installed over ball portion 760 (see FIG. 14B). Grounding plate 710 may be electrically coupled to socket 254 in response to making contact therewith. In this manner, an electrical circuit may be closed in response to grounding plate 710 contacting trailer coupler 202. Grounding plate 710 may be preloaded in response to trailer coupler 202 being installed over ball portion 760. For example, before trailer coupler 202 is installed over ball portion 760, grounding plate 710 may be in a first position (see FIG. 14A) and after trailer coupler 202 is installed over ball portion 760, grounding plate 710 may be moved to a second position (see FIG. 14B) by socket 254. In this manner, grounding plate 710 may maintain direct contact with socket 254 in the event socket 254 moves with respect to ball portion 760 as the grounding plate 710 flexes together with the socket 254 with respect to ball portion 760 while maintaining contact therewith.

In various embodiments, grounding plate 710 at least partially surrounds ball portion 760. Grounding plate 710 may be attached to hitch portion 762 and may extend from hitch portion 762 toward ball portion 760. In various embodiments, a first end of grounding plate 710 is attached to hitch portion 762 and a second, free end of grounding plate 710 may at least partially surround the ball portion 760. In this regard, grounding plate 710 may be coupled to hitch portion 762 in a cantilevered manner. In various embodiments, grounding plate 710 is coupled to hitch portion 762 via one or more fasteners (e.g., a bolt, a screw, or the like). In this regard, grounding plate 710 may comprise one or more apertures configured to receive said one or more fasteners. Grounding plate 710 may comprise a mounting surface 781 configured to contact the ball hitch 704. Mounting surface 781 may conform to a geometry of the ball hitch 704. In various embodiments, mounting surface 781 is rounded or curved. In various embodiments, an electrical connection is formed between mounting surface 781 and ball hitch 704. Grounding plate 710 may comprise a curved portion 782 whereby the mounting plate bends away from the ball hitch 704 and extends toward ball portion 760. Curved portion 782 may define a middle portion of the grounding plate 710. Grounding plate 710 may comprise an upwardly facing contact surface 783 configured to contact an underside surface 784 of trailer coupler 202. In various embodiments, the underside surface 784 is at least partially defined by socket 254. In various embodiments, contact surface 783 is a flat (e.g., planar) surface. In various embodiments, the fixed end (first end) of grounding plate 710 is at least partially defined by mounting surface 781. In various embodiments, contact surface 783 defines the free end (second end) of the grounding plate 710. In this regard, the first (fixed) end of grounding plate 710 may be fixed with respect to the ball hitch 704 while the second (free) end of the grounding plate 710 may be generally free to move with respect to the ball hitch 704. The curved portion 782 may be configured to bend or flex in response to the free end of grounding plate 710 moving with respect to the ball hitch 704.

With reference to FIG. 13, power through trailer hitch system 701 may further include a hitch receiver 706. Ball hitch 704 may be configured for interfacing with hitch receiver 706. More particularly, hitch portion 762 may be configured to be received by hitch receiver 706. Hitch receiver 706 may be configured to be mounted to a rear end of a truck (e.g., truck 104 of FIG. 1). For example, hitch receiver 706 may be mounted to a body 707 (e.g., a chassis or a frame) of a truck.

Figures 15A, 15B, 15C:
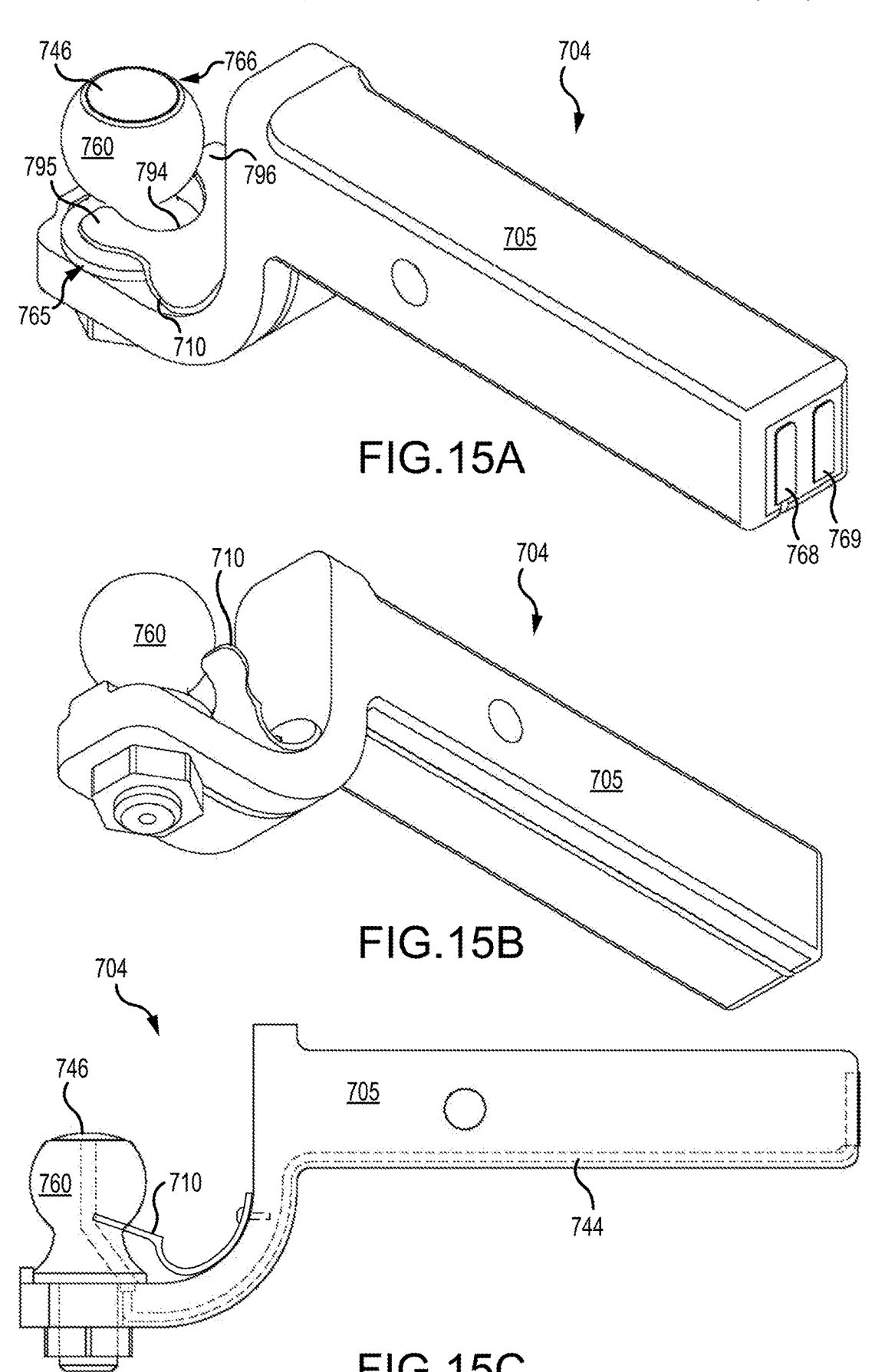
FIG. 15A, FIG. 15B, and FIG. 15C illustrate a power through ball hitch with a grounding plate and a pair of electrical connectors, in accordance with various embodiments.

With reference to FIG. 15A, FIG. 15B, and FIG. 15C, ball hitch 704 further includes an electrical contact 746 (also referred to herein as a first electrical contact). Electrical contact 746 may be similar to electrical contact 246 of FIG. 2. Ball hitch 704 may further include a conductor 744. Conductor 744 may be similar to conductor 244 of FIG. 2. Conductor 744 may extend from electrical contact 746. Ball hitch 704 may further include an electrical contact 768 (also referred to herein as a second electrical contact). In various embodiments, electrical contact 768 is connected to a positive terminal of the electrical circuit. Conductor 744 may extend from electrical contact 768 to electrical contact 746. In this regard, electrical contact 768 may be electrically connected with conductor 744. Electrical contact 768 may be electrically connected with electrical contact 746 with conductor 744. In this regard, conductor 744 may provide an electrically conductive path from electrical contact 768 to electrical contact 746. Conductor 744, electrical contact 768, and electrical contact 746 may be electrically isolated from the body 705 of ball hitch 704 (e.g., via an electrical insulator).

Ball hitch 704 may further include an electrical contact 769 (also referred to herein as a third electrical contact). In various embodiments, electrical contact 769 is connected to a negative terminal (e.g., a floating ground) of the electrical circuit. Electrical contact 769 may be electrically coupled to the body 705 of ball hitch 704. In this regard, electrical contact 769 may be electrically coupled to grounding plate 710 via body 705.

In various embodiments, and with reference to FIG. 15A, grounding plate 710 may comprise a recess 794 configured to receive the ball portion 760. In this manner, a first finger 795 of the grounding plate 710 may extend around a first side of ball portion 760. Moreover, a second finger 796 of the grounding plate 710 may extend around a second side of ball portion 760. In this manner, grounding plate 710 may at least partially surround ball portion 760. First finger 795 and second finger 796 may at least partially define the contact surface 783 (see FIG. 14A) of grounding plate 710. Grounding plate 710 may be located between a base 765 of the ball portion 760 and a tip 766 of the ball portion 760.

Figures 16A, 16B:
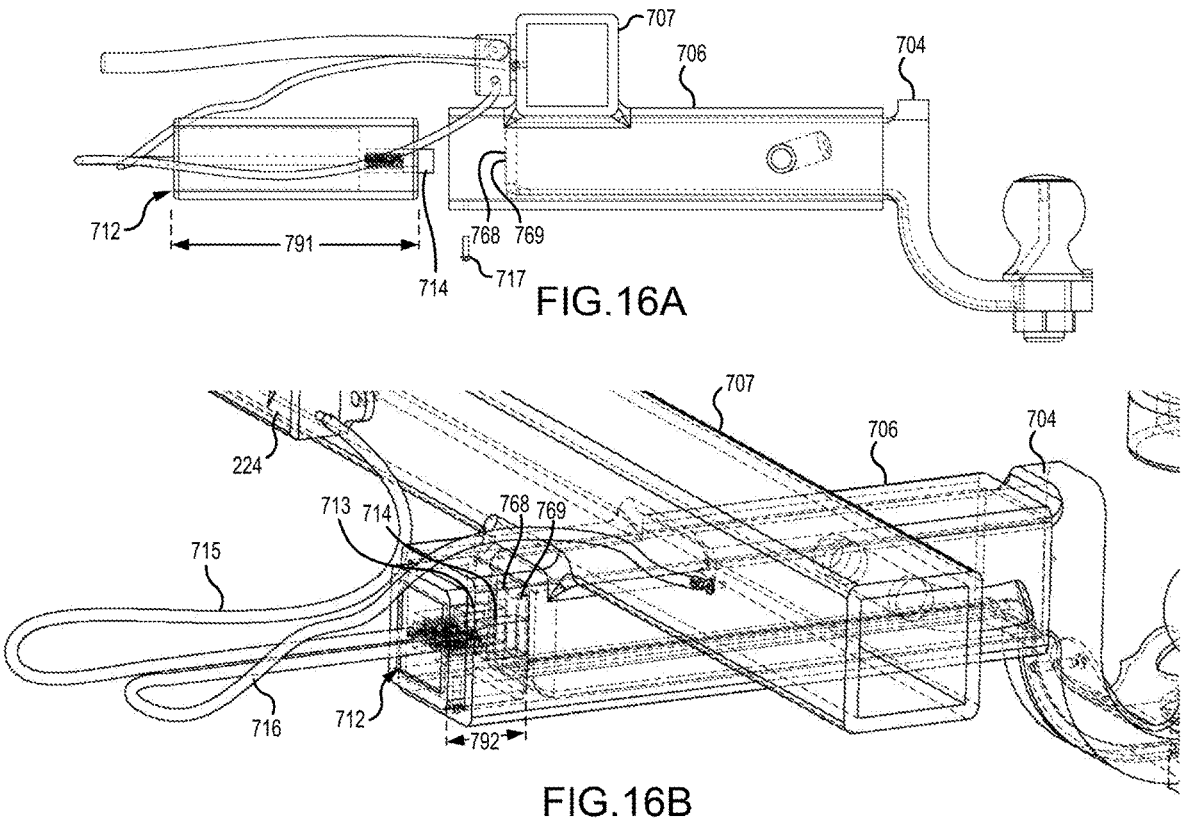
FIG. 16A illustrates an assembly view a ball hitch adapter having an initially oversized length, in accordance with various embodiments.
FIG. 16B illustrates an installed view the ball hitch adapter of FIG. 16A after being trimmed to a desired installed length, in accordance with various embodiments.

With combined reference to FIG. 16A and FIG. 16B, trailer hitch system 701 may include a ball hitch adapter 712. In various embodiments, ball hitch adapter 712 is configured to be received into hitch receiver 706 for electrical connection with electrical contacts 768, 769. Ball hitch adapter 712 may comprise a first electrical contact 713 and a second electrical contact 714 electrically coupled to first electrical wire 715 and second electrical wire 716, respectively. First electrical contact 713 and second electrical contact 714 are configured to contact electrical contact 768 and electrical contact 769, respectively. In this regard, first electrical contact 713 and a second electrical contact 714 may be disposed at least partially in hitch receiver 706 in the installed position. In various embodiments, first electrical contact 713 and second electrical contact 714 are disposed entirely in hitch receiver 706 in the installed position. In various embodiments, first electrical contact 713 and second electrical contact 714 are spring loaded so as to maintain contact with electrical contact 768 and electrical contact 769, respectively, when ball hitch adapter 712 is in the installed position, as illustrated in FIG. 16B. In this regard, first electrical contact 713 and second electrical contact 714 may each comprise a spring configured to bias the first electrical contact 713 and second electrical contact 714, respectively to an extended position. In various embodiments, first electrical contact 713 and second electrical contact 714 extend from a first end (e.g., the right end in FIG. 16A) of ball hitch adapter 712.

In various embodiments, first electrical wire 715 is electrically coupled to and extending between control unit 224 and first electrical contact 713. In this manner, when ball hitch adapter 712 is in the installed position, electrical contact 768 may be configured to receive electrical power from power line 230 via control unit 224 and first electrical contact 713. In various embodiments, second electrical wire 716 is electrically coupled to and extending between body 707 and second electrical contact 714. In this manner, when ball hitch adapter 712 is in the installed position, electrical contact 769 may be grounded to body 707. In various embodiments, first electrical wire 715 and second electrical wire 716 extend from a second end (e.g., the left end in FIG. 16A) of ball hitch adapter 712.

In various embodiments, the body of ball hitch adapter 712 may comprise a hollow tubular geometry. Ball hitch adapter 712 may be made from a metal or plastic material. In various embodiments, ball hitch adapter 712 may comprise a square cross-sectional geometry. Ball hitch adapter 712 may be sized to be received into hitch receiver 706. For example, the outer dimension of ball hitch adapter 712 may be between 90% and 100% of the inner dimensions of hitch receiver 706. For example, hitch receiver 706 may comprise a 2"×2" (5.08×5.08 cm) generally square aperture and the outer profile of ball hitch adapter 712 may comprise a generally square geometry of between 1.8"×1.8" (4.572× 4.572 cm) and 2"×2" (5.08×5.08 cm). However, other inner dimensions for hitch receiver 706 may exist and the above dimensions are provided for exemplary purposes and the outer dimensions of ball hitch adapter 712 are not particularly limited in this regard. For example, other dimensions for hitch receiver openings include 1¼", 2", 2½", and 3" sizes, among others. Ball hitch adapter 712 may be manufactured at a first (e.g., oversized) length 791. Ball hitch adapter 712 may be configured to be fitted to a particular user's hitch receiver 706 and trimmed to a desired length, for example such that ball hitch adapter 712 is substantially flush with hitch received 706, or another length as desired. FIG. 16A shows ball hitch adapter 712 at the first length 791. FIG. 16B shows ball hitch adapter 712 at a second (e.g., trimmed) length 792.

In various embodiments, ball hitch adapter 712 is fastened to hitch receiver by a fastener 717. Fastener 717 may be a screw, a bolt, or the like. Fastener 717 may be received through hitch receiver 706 into ball hitch adapter 712 to secure the ball hitch adapter 712 with respect to hitch receiver 706. In this regard, installing ball hitch adapter 712 into hitch receiver 706 may include drilling a hole into hitch receiver 706 and/or ball hitch adapter 712 for receiving the fastener 717.

Figures 17A, 17B, 17C:
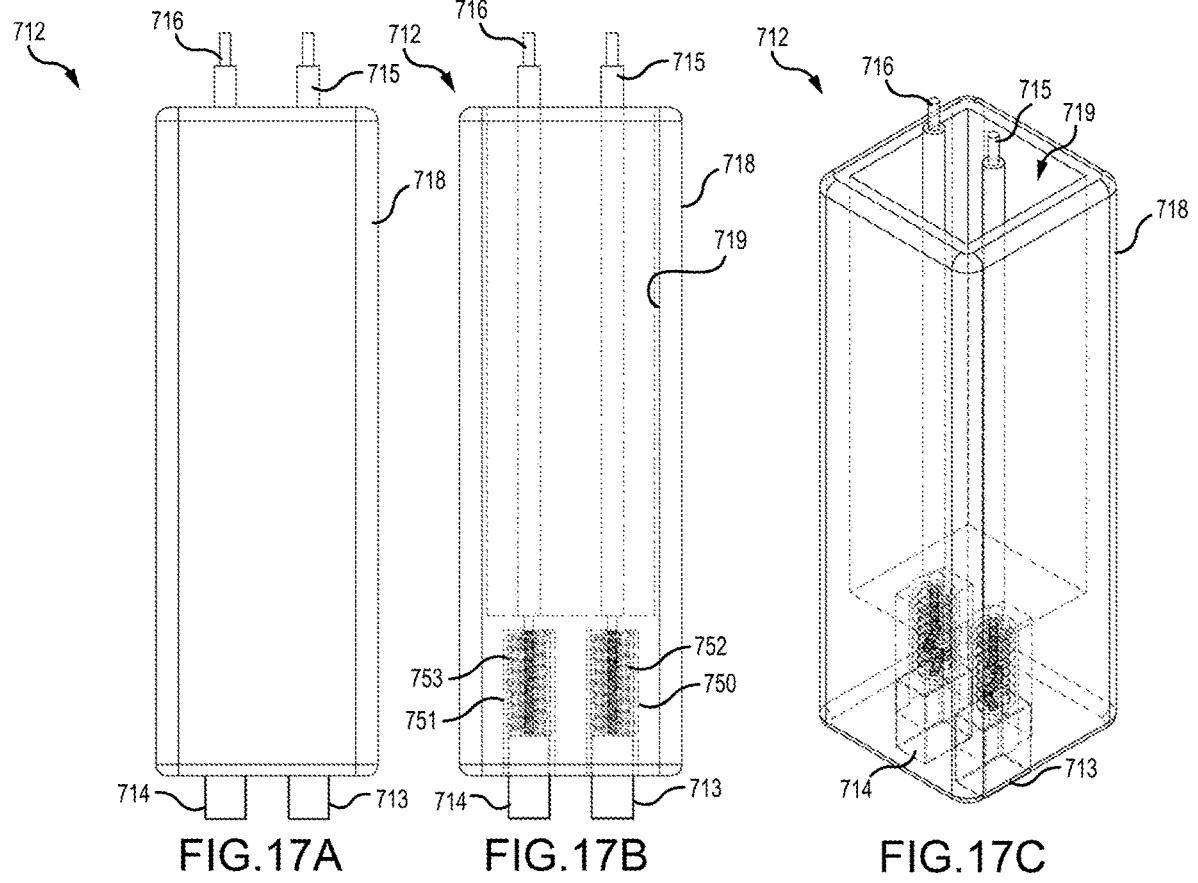
FIG. 17A, FIG. 17B, and FIG. 17C illustrate the ball hitch adapter having a hollow tubular body defining a main opening at a first end thereof and two connector openings at a second end thereof, in accordance with various embodiments.

With reference to FIG. 17A, FIG. 17B, and FIG. 17C, ball hitch adapter 712 is illustrated, in accordance with various embodiments. Ball hitch adapter 712 comprises a tubular body 718 defining a main opening 719 extending through the second end of ball hitch adapter 712. A first contact opening 750 may be located at the first end of ball hitch adapter 712. A second contact opening 751 may be located at the first end of ball hitch adapter 712. First electrical contact 713 may extend from first contact opening 750. Second electrical contact 714 may extend from second contact opening 751. A first spring 752 may be located in the first contact opening 750. First spring 752 may be configured to bias first electrical contact 713 toward the extended position. A second spring 753 may be located in the second contact opening 751. Second spring 753 may be configured to bias second electrical contact 714 toward the extended position.

Figures 18A, 18B:
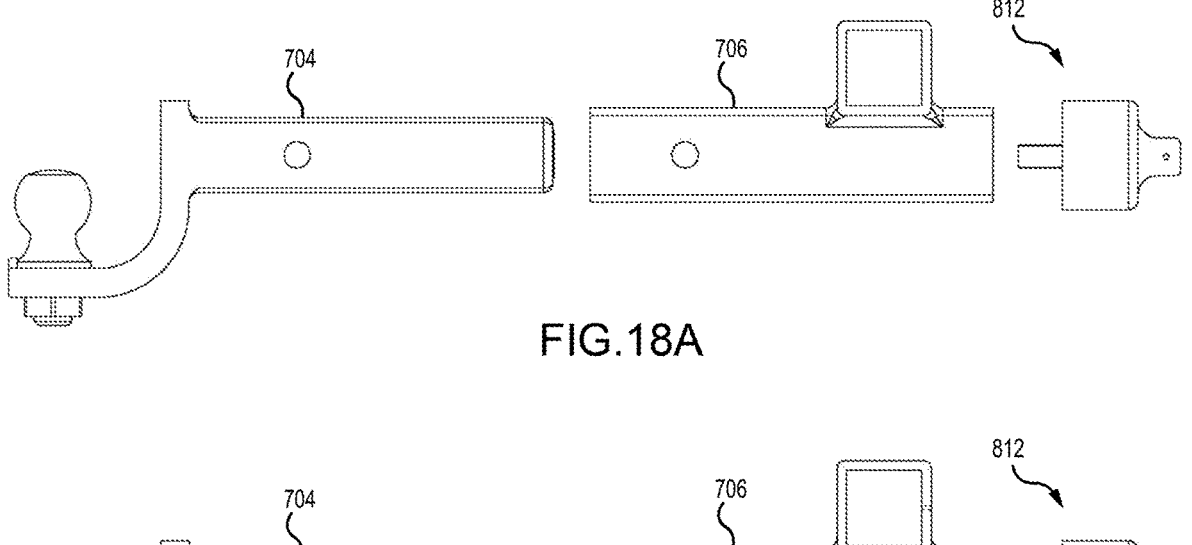
FIG. 18A and FIG. 18B illustrate an assembly view of a ball hitch adapter configured to be installed over an end of a hitch receiver, in accordance with various embodiments.

With reference to FIG. 18A and FIG. 18B, an assembly view of a ball hitch adapter 812, with respect to hitch receiver 706 and ball hitch 704 is illustrated, in accordance with various embodiments. While ball hitch adapter 712 is described with respect to FIG. 16A and FIG. 16B as fitting inside of hitch receiver 706, the ball hitch adapter (e.g., ball hitch adapter 812) may also be configured to fit over an end of hitch receiver 706. In this regard, ball hitch adapter 812 may be similar to ball hitch adapter 712, except that ball hitch adapter 812 is configured to fit over an end of hitch receiver 706. In this regard, an end of hitch receiver 706 may be received into ball hitch adapter 812 to install ball hitch adapter 812 to hitch receiver 706.

Benefits and other advantages have been described herein with regard to specific embodiments. Furthermore, the connecting lines shown in the various figures contained herein are intended to represent example functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A ball hitch comprising:
a hitch portion for interfacing with a hitch receiver associated with a vehicle;
a ball portion comprising a hitch ball configured to couple with a tongue of a trailer; and
a grounding plate configured to contact the tongue of the trailer in response to the ball portion being coupled with the tongue of the trailer,
wherein the grounding plate is located between a base of the ball portion and a tip of the ball portion.

2. The ball hitch of claim 1, wherein the grounding plate is mounted to the hitch portion.

3. The ball hitch of claim 2, wherein the grounding plate extends from the hitch portion toward the ball portion.

4. The ball hitch of claim 3, wherein the grounding plate is cantilevered.

5. The ball hitch of claim 4, wherein the grounding plate comprises an electrically conductive material.

6. The ball hitch of claim 1, wherein the grounding plate is configured to flex between a first position and a second position to preload the grounding plate in response to the ball portion being coupled with the tongue of the trailer.

7. The ball hitch of claim 1, further comprising:
a first electrical contact disposed on the ball portion;
a second electrical contact disposed on the hitch portion;
a conductor extending from the first electrical contact to the second electrical contact, wherein the first electrical contact, the second electrical contact, and the conductor are electrically insulated from a body of the hitch portion and a body of the ball portion; and
a third electrical contact electrically coupled to the body of the hitch portion, wherein the grounding plate is electrically coupled to the body of the hitch portion.

8. The ball hitch of claim 7, wherein the second electrical contact and the third electrical contact are located at a first side of the hitch portion and the ball portion is located at a second side of the hitch portion.

9. The ball hitch of claim 8, wherein the third electrical contact is configured to ground the ball hitch to the vehicle.

10. A grounding plate for a ball hitch, the grounding plate comprising:
a flexible metallic plate comprising a mounting surface defining a first end of the flexible metallic plate, a curved portion, and a contact surface defining a second end of the flexible metallic plate, wherein the flexible metallic plate is configured to be coupled to the ball hitch and extend from a hitch portion of the ball hitch toward a ball portion of the ball hitch in a cantilevered manner,
wherein the contact surface of the grounding plate is configured to contact a tongue of a trailer in response to the ball portion being coupled with the tongue of the trailer, the flexible metallic plate is configured to bend away from the ball hitch via the curved portion, and the mounting surface is configured to contact the ball hitch,
wherein the grounding plate comprises a recess configured to at least partially receive the ball portion.

11. The grounding plate of claim 10, wherein the grounding plate comprises an electrically conductive material.

12. The grounding plate of claim 10, wherein the grounding plate is configured to flex between a first position and a second position to preload the grounding plate in response to the ball portion being coupled with the tongue of the trailer.

13. The grounding plate of claim 10, wherein the grounding plate comprises a first finger configured to extend around a first side of the ball portion and a second finger configured to extend around a second side of the ball portion, wherein the first finger and the second finger at least partially define the recess.

14. A ball hitch comprising:
a hitch portion for interfacing with a hitch receiver associated with a vehicle;
a ball portion comprising a hitch ball configured to couple with a tongue of a trailer; and
a grounding plate configured to contact the tongue of the trailer in response to the ball portion being coupled with the tongue of the trailer;
a first electrical contact disposed on the ball portion;
a second electrical contact disposed on the hitch portion;
a conductor extending from the first electrical contact to the second electrical contact, wherein the first electrical contact, the second electrical contact, and the conductor are electrically insulated from a body of the hitch portion and a body of the ball portion; and
a third electrical contact electrically coupled to the body of the hitch portion, wherein the grounding plate is electrically coupled to the body of the hitch portion.

15. The ball hitch of claim 14, wherein the second electrical contact and the third electrical contact are located at a first side of the hitch portion and the ball portion is located at a second side of the hitch portion.

16. The ball hitch of claim 15, wherein the third electrical contact is configured to ground the ball hitch to the vehicle.

* * * * *